United States Patent
Kaushik et al.

(10) Patent No.: US 11,252,108 B2
(45) Date of Patent: Feb. 15, 2022

(54) CONTROLLER FOR ORDERING OUT-OF-ORDER TRANSACTIONS IN SOC

(71) Applicant: NXP USA, INC., Austin, TX (US)

(72) Inventors: Arvind Kaushik, Ghaziabad (IN);
Amrit Pal Singh, Ludhiana (IN);
Puneet Khandelwal, Noida (IN);
Pradeep Singh, Noida (IN)

(73) Assignee: NXP USA, Inc., Austin, TX (US)

( * ) Notice: Subject to any disclaimer, the term of this patent is extended or adjusted under 35 U.S.C. 154(b) by 239 days.

(21) Appl. No.: 16/446,598

(22) Filed: Jun. 19, 2019

(65) Prior Publication Data

US 2020/0403942 A1    Dec. 24, 2020

(51) Int. Cl.
*H04L 12/861*    (2013.01)

(52) U.S. Cl.
CPC ................ *H04L 49/9057* (2013.01)

(58) Field of Classification Search
None
See application file for complete search history.

(56) References Cited

U.S. PATENT DOCUMENTS

| | | | |
|---|---|---|---|
| 7,043,593 B1 * | 5/2006 | Tischler | G06F 13/161 710/306 |
| 7,529,245 B1 * | 5/2009 | Muller | H04L 49/90 370/394 |
| 8,656,078 B2 | 2/2014 | Lim | |
| 8,782,356 B2 | 7/2014 | Panavich et al. | |
| 8,880,745 B2 * | 11/2014 | Jandhyam | G06F 3/0659 710/6 |
| 9,021,169 B2 * | 4/2015 | Lee | G06F 13/14 710/110 |
| 9,311,244 B2 * | 4/2016 | Salisbury | G06F 12/0831 |
| 9,348,775 B2 | 5/2016 | Jandhyam | |
| 9,569,362 B2 | 2/2017 | Sanzone et al. | |
| 9,767,057 B2 * | 9/2017 | Darbari | G06F 9/467 |
| 10,515,030 B2 * | 12/2019 | Avrukin | G06F 13/4234 |
| 10,789,110 B2 * | 9/2020 | Sanghi | G06F 9/467 |
| 10,795,844 B2 * | 10/2020 | Thompson | G06F 13/42 |
| 2016/0139806 A1 | 5/2016 | Sanzone et al. | |

* cited by examiner

*Primary Examiner* — Tri H Phan

(57) ABSTRACT

A transaction controller orders transactions between a master device and a slave device, where the transactions may be received out-of-order. First and second transactions have respective first and second sets of data packets. The transaction controller includes a transaction table, a first ordering counter, and a first sequence counter having first and second values when the first and second transactions are initiated. The first and second values are stored in the transaction table based on first and second transaction identifiers (TIDs) that are associated with the first and second transactions. The transaction controller determines, based on the second value, the second TID, and a current value of the first ordering counter, whether the first and second sets of data packets were received out-of-order. Based on the determination, the second set of data packets is transmitted to the master device after the first set of data packets.

20 Claims, 16 Drawing Sheets

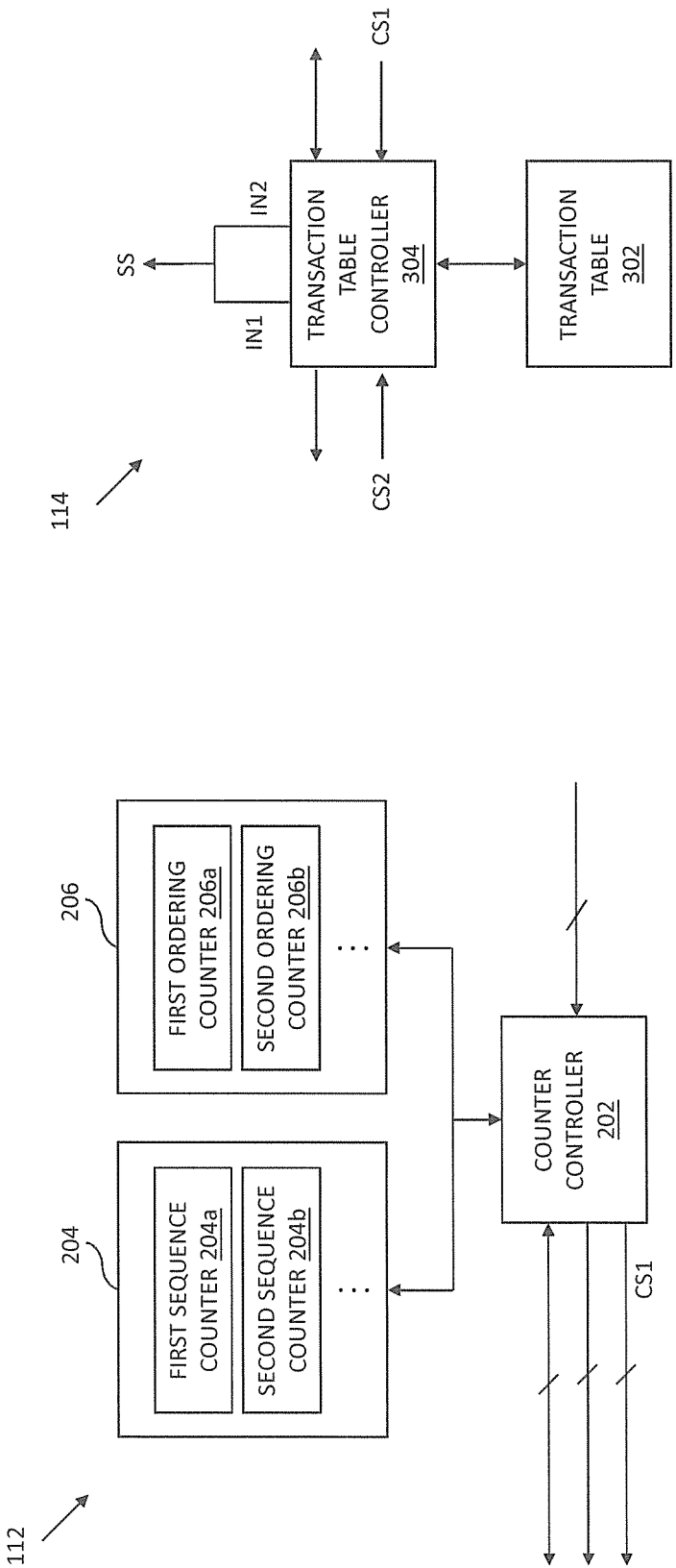

| TID | TS FLAG | VMID | SEQ_CNT | BURST LENGTH | BURST SIZE | RS FLAG |
|---|---|---|---|---|---|---|
| T1 | 0 | 0 | 0 | 8 | 1 | 1 |
| T2 | 0 | 0 | 1 | 8 | 2 | 0 |
| T3 | 0 | 0 | 2 | 8 | 1 | 0 |
| T4 | 0 | 1 | 0 | 16 | 1 | 0 |
| T5 | 0 | 1 | 1 | 16 | 1 | 0 |
| T6 | 0 | 1 | 2 | 16 | 2 | 0 |
| ... | ... | ... | ... | ... | ... | ... |

FIG. 3B

CONTROLLER FOR ORDERING OUT-OF-ORDER TRANSACTIONS IN SOC

BACKGROUND

The present invention relates generally to system-on-chips (SoCs), and, more particularly, to a controller for ordering out-of-order transactions in an SoC.

A master device on an SoC initiates a set of read transactions for reading associated data packets stored in a slave device of the SoC. The master device executes the read transactions sequentially and assigns each transaction a distinct transaction identifier (TID). Each transaction is associated with a set of data packets stored in the slave device.

To initiate a transaction on the SoC, the master device provides a TID of the initiated transaction along with control data corresponding to the associated set of data packets to the slave device. The control data includes at least a read address of the set of data packets. When the slave device receives two or more TIDs, the slave device may provide corresponding sets of data packets to the master device via a controller associated with the master device in an order that is different from the reception of the TIDs, i.e., the sets of data packets are provided out-of-order. The controller queues each set of data packets in a data buffer, and provides the sets of data packets in-order to the master device. However, the master device includes multiple virtual masters and each virtual master initiates a corresponding set of transactions. Thus, the controller includes a separate data buffer for each virtual master to queue the associated sets of data packets. These multiple buffers take up a large area and consume a lot of power.

Therefore, it would be advantageous to have a controller that orders the transactions without using multiple data buffers, thereby reducing area and power consumption of the SoC.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

FIG. 2 is a block diagram of a counter control circuit of the transaction controller of FIG. 1 in accordance with an embodiment of the present invention;

FIG. 3A is a block diagram of a transaction table control circuit of the transaction controller of FIG. 1 in accordance with an embodiment of the present invention;

FIG. 3B illustrates a transaction table of the transaction table control circuit of FIG. 3A in accordance with an embodiment of the present invention;

DETAILED DESCRIPTION

Figure 1:
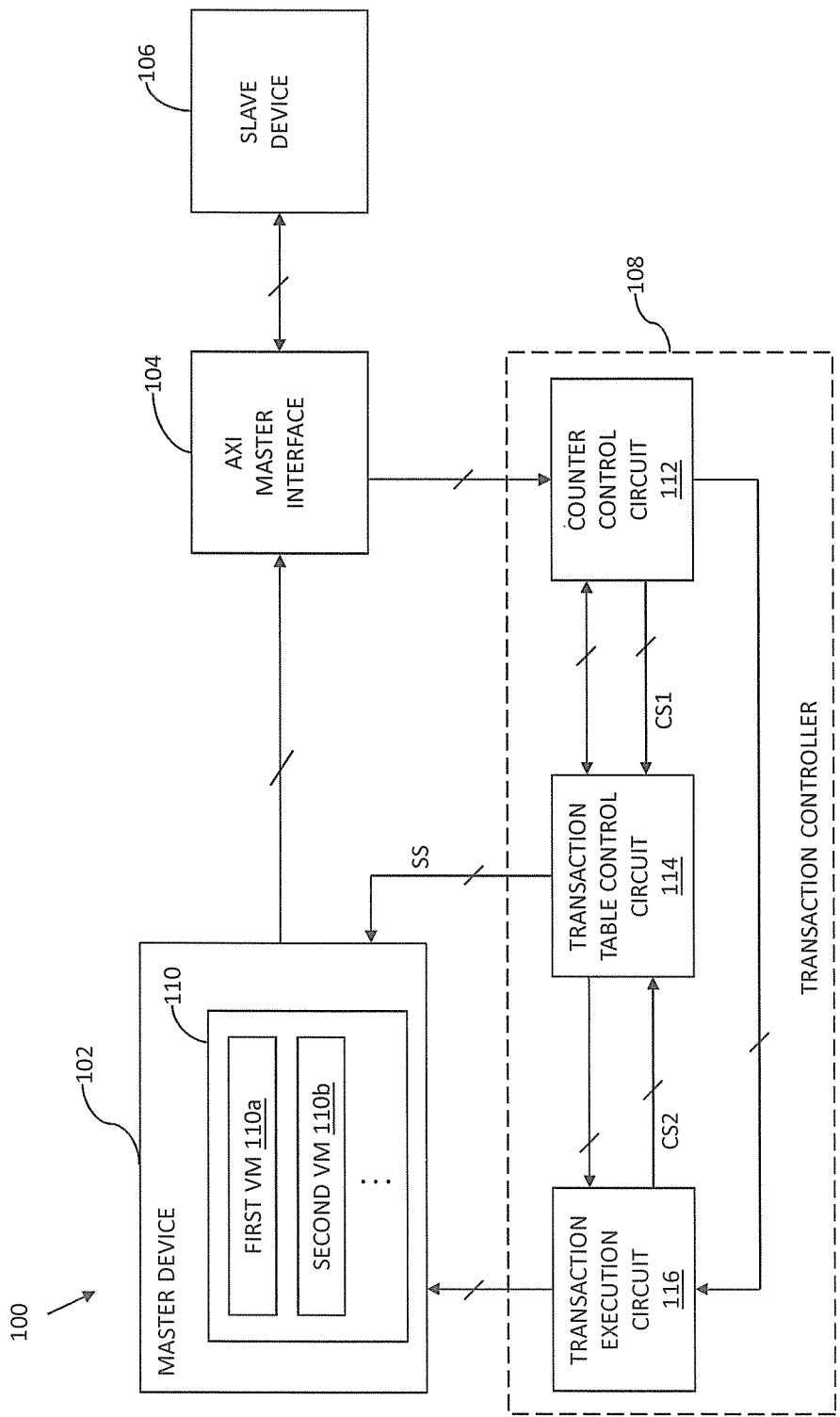
FIG. 1 is a block diagram of a SoC that includes a transaction controller in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In one embodiment, the present invention provides a transaction controller for ordering a plurality of transactions between a master device and a slave device. The transaction controller includes a transaction table, a first sequence counter, and a first ordering counter. When first and second transactions, which include first and second sets of data packets, are initiated, the first sequence counter has first and second values, respectively. The first ordering counter is incremented with each transmission of the first and second sets of data packets that are associated with the first and second transactions, respectively, from the transaction controller to the master device. The transaction controller is configured to record the first and second values with first and second transaction identifiers (TIDs), respectively, in the transaction table. The first and second TIDs are associated with the first and second transactions, and the first transaction is initiated before the second transaction.

The transaction controller further is configured to determine based on the second value, the second TID, and a current value of the first ordering counter, whether the transaction controller has received the second set of data packets after the first set of data packets. The transaction controller also is configured to transmit the first and second sets of data packets to the master device based on the determination. The first and second sets of data packets are transmitted such that the second set of data packets is transmitted after the transmission of the first set of data packets, thereby ordering the first and second transactions.

In another embodiment, the present invention provides a method for ordering a plurality of transactions between a master device of a SoC and a slave device of the same SoC. The method includes recording first and second values of a first sequence counter associated with the master device in a transaction table, based on first and second TIDs that are associated with first and second transactions, respectively, where the first and second transactions are associated with first and second sets of data packets stored in the slave device.

The method further includes determining based on the second value, the second TID, and a current value of a first ordering counter, whether the transaction controller has received the second set of data packets after the first set of data packets. The method also includes transmitting, to the master device, the first set of data packets, and the second set of data packets after the transmission of the first set of data packets based on the determination, thereby ordering the first and second transactions.

In yet another embodiment, the present invention provides a transaction controller for ordering a plurality of transactions between a master device of a SoC and a slave device of the same SoC. The transaction controller includes counter control circuitry, transaction table control circuitry, and transaction execution circuitry. The counter control circuitry includes first sequence and first ordering counters, and is connected to the master device for receiving first and second TIDs that are associated with first and second transactions, respectively. The counter control circuitry receives, from the slave device, first and second sets of data packets that are respectively associated with the first and second transactions. The first transaction is initiated before the second transaction and first and second values of the first sequence counter are associated with first and second TIDs when the first and second transactions are initiated. The first ordering counter is incremented with each transmission of the first and second sets of data packets from the transaction controller to the master device.

The transaction table control circuitry includes a transaction table, and is connected to the counter control circuitry for receiving the first and second TIDs and the first and second values. The transaction table control circuitry records the first and second values with the first and second TIDs in the transaction table.

The transaction execution circuitry is connected to the transaction table control circuitry for receiving the recorded first and second values and the first and second TIDs, and to the counter control circuitry for receiving a current value of the first ordering counter and the first and second sets of data packets. The transaction execution circuitry determines, based on the second value, the second TID, and the current value, whether the counter control circuitry has received the second set of data packets after the first set of data packets. The transaction execution circuitry transmits to the master device, based on the determination, the first set of data packets, and then the second set of data packets after the transmission of the first set of data packets, thereby ordering the first and second transactions.

Various embodiments of the present invention provide a transaction controller for ordering transactions between master and slave devices. The master device initiates the transactions sequentially and provides distinct TIDs for identifying each transaction. The slave device stores a set of data packets for each transaction. The transaction controller includes a transaction table and sets of sequence and ordering counters. A sequence counter is incremented when an associated transaction is initiated.

The transaction controller records the counter values and the corresponding TIDs in the transaction table. The transaction controller receives a set of data packets from the slave device and determines whether the received set of data packets was received out-of-order. The transaction controller transmits the received set of data packets when the data packets are received in-order. If the set of data packets was received out-of-order, then the transaction controller waits for the previous set of data packets to be received and then transmits the previous and received sets of data packets in-order. An ordering counter is incremented when an associated set of data packets is transmitted to the master device.

As the transaction controller orders the transactions using the sequence and ordering counters, the transaction controller consumes less area and power on a system-on-chip (SoC) than conventional transaction controllers that include data buffers for queuing the transactions.

Referring now to FIG. 1, a block diagram of a system-on-chip (SoC) 100 in accordance with an embodiment of the present invention is shown. The SoC 100 includes a master device 102, an Advanced eXtensible Interface (AXI) master interface 104, a slave device 106, and a transaction controller 108. The master and slave devices 102 and 106 and the AXI master interface 104 communicate using the AXI protocol. The SoC 100 is used in data-intensive applications such as convolutional neural networking systems, advanced driver-assistance systems (ADAS), and wired/wireless networking systems. It will be understood by those of skill in the art that the SoC 100 may include multiple master and slave devices 104 and 106, but just one is shown and discussed for ease of understanding the invention.

The master device 102 initiates sets of transactions for receiving data from the slave device 106. The master device 102 includes a set of virtual masters (VMs) 110 of which first and second VMs 110a and 110b (hereinafter referred to as V1M and V2M 110a and 110b) are shown. Each VM is associated with a corresponding set of transactions. In one example, the V1M and V2M 110a and 110b are associated with first and second sets of transactions, respectively. For ease of understanding the invention, it is assumed that the first set of transactions includes first through third sequentially executed transactions, and the second set of transactions includes fourth through sixth transactions, which also are executed sequentially. In one embodiment, the master device 102 is a direct memory access (DMA) controller and each VM is a DMA channel.

The master device 102 receives a set of transaction identifiers (TIDs), which are distinct and assigns a TID to each transaction to identify the transaction. In one example, the first through sixth transactions are assigned with first through sixth TIDs, respectively.

Each transaction is associated with a corresponding set of data packets and a set of transaction attributes (TAs). Thus, the first through sixth transactions are associated with first through sixth sets of data packets, which are stored in the slave device 106, and first through sixth sets of TAs, respectively. The first through sixth sets of TAs are associated with the first through sixth TIDs, first through sixth VM identifiers (VMIDs), first through sixth burst lengths, and first through sixth burst sizes, respectively. The first through sixth sets of TAs are explained in detail in conjunction with FIG. 3B. To initiate a transaction, the master device 102 provides to the AXI master interface 104, a set of TAs associated with the transaction and a read address (RA) of a first data packet (i.e., a data packet that appears first) in the set of data packets that is associated with the transaction. In one example, to initiate the first transaction, the master device 102 provides to the AXI master interface 104, the first set of TAs and a first RA of a first data packet in the first set of data packets. It will be understood by those of skill in the art that to initiate the second through sixth transactions, second through sixth RAs and the second through sixth sets of TAs are provided to the AXI master interface 104.

The AXI master interface 104 is connected to the master device 102 for receiving the first through sixth RAs and the first through sixth sets of TAs, when the first through sixth transactions are initiated. The AXI master interface 104 provides the first through sixth sets of TAs to the transaction controller 108, and the first through sixth RAs, the first through sixth TIDs, the first through sixth burst lengths, and the first through sixth burst sizes to the slave device 106.

The slave device 106 is connected to the AXI master interface 104 for receiving the first through sixth RAs, the first through sixth TIDs, the first through sixth burst lengths, and the first through sixth burst sizes. In one embodiment, the slave device 106 is a double data rate (DDR) random access memory (RAM).

On receiving the first through sixth RAs and the first through sixth TIDs, the slave device 106 retrieves, from first through sixth memory blocks (not shown) of the slave device 106, the first through sixth sets of data packets, respectively, and provides the first through sixth sets of data packets along with the received first through sixth TIDs, respectively, to the AXI master interface 104.

The transaction controller 108 is connected to the AXI master interface 104 to receive the first through sixth sets of TAs, the first through sixth sets of data packets and the first through sixth TIDs. The initiation of each of the first through sixth transactions is determined by the transaction controller 108 when each of the first through sixth sets of TAs is received. The transaction controller 108 orders the first and second sets of transactions between the master and slave devices 102 and 106. The transaction controller 108 includes a counter control circuit 112, a transaction table control circuit 114, and a transaction execution circuit 116.

The counter control circuit 112 is connected to the AXI master interface 104 for receiving the first through sixth RAs, the sets of TAs, the sets of data packets, and the TIDs. The counter control circuit 112 also receives first through sixth transmission status (TS) flags. The first through sixth TS flags indicate whether the first through sixth sets of data packets have been transmitted by the transaction controller 108 to the master device 102, respectively. Based on the first through sixth TS flags, the counter control circuit 112 increments first and second ordering counters 206a and 206b (shown in FIG. 2) of the counter control circuit 112.

The counter control circuit 112 generates a first control signal CS1 to indicate reception of each of the first through sixth sets of data packets. In one embodiment, the first control signal CS1 is a multi-bit signal having a set of bits representing a received TID, and a last bit to indicate reception of a set of data packets associated with the received TID. The counter control circuit 112 will be explained in more detail in conjunction with FIG. 2.

The transaction table control circuit 114 is connected to the counter control circuit 112 for receiving the first through sixth sets of TAs and the first control signal CS1. The transaction table control circuit 114 stores or saves the first through sixth sets of TAs in a transaction table 302 (shown in FIG. 3B).

The transaction table control circuit 114 associates first through sixth reception status (RS) flags (that are indicative of reception of the first through sixth sets of data packets by the counter control circuit 112) with the first through sixth sets of TAs, respectively. The transaction table control circuit 114 further associates the first through sixth TS flags with the first through sixth sets of TAs, respectively. Based on the first control signal CS1, the transaction table control circuit 114 sets the first through sixth RS flags when the first through sixth sets of data packets have been received by the counter control circuitry 112, respectively.

The transaction table control circuit 114 also receives a second control signal CS2. The second control signal CS2 indicates each transmission of the first through sixth sets of data packets to the master device 102 from the transaction controller 108. In one embodiment, the second control signal CS2 is a multi-bit signal having a set of bits representing a value of a VMID, and a last bit indicating whether a set of data packets associated with the VM has been transmitted. Based on the value of the second control signal CS2, the transaction table control circuit 114 sets the first through sixth TS flags.

The transaction table control circuit 114 provides the first through sixth TS flags from the transaction table 302 to the counter control circuit 112. The transaction table control circuit 114 also provides to the master device 102, a status signal SS that is indicative of an accessibility of the transaction table 302. The master device 102 initiates a transaction when the transaction table 302 is accessible, i.e., when the transaction table 302 has at least one available entry for recording a set of TAs.

The transaction execution circuit 116 is connected to the counter control circuit 112 for receiving the first through sixth sets of data packets and the first through sixth TIDs. The transaction execution circuit 116 orders the first through third sets of data packets and the fourth through sixth sets of data packets, and provides the first through sixth sets of data packets to the corresponding VMs (i.e., the V1M and V2M 110a and 110b). The transaction execution circuit 116 also provides the second control signal CS2 to the transaction table control circuit 114 upon transmission of each set of data packets to the corresponding VMs.

Referring now to FIG. 2, a block diagram of the counter control circuit 112 in accordance with an embodiment of the present invention is shown. The counter control circuit 112 includes a counter controller 202, a set of sequence counters 204, and a set of ordering counters 206 of which first and second sequence and ordering counters 204a and 204b and 206a and 206b are shown (hereinafter referred to as S1, S2, O1, and O2 counters 204a, 204b, 206a, and 206b, respectively). In one embodiment, the sequence and ordering counters are up-counters. The sequence and ordering counters are initialized to zero when the SoC 100 is powered-ON.

The counter controller 202 receives the first through sixth RAs, the sets of TAs, the sets of data packets, the TIDs, and the TS flags. The counter control circuit 112 provides the first through sixth sets of data packets and the first through sixth TIDs to the transaction execution circuit 116, and provides the first through sixth sets of TAs to the transaction table control circuit 114. The counter controller 202 is connected to the sets of sequence and ordering counters 204 and 206.

The S1 and S2 counters 204a and 204b are associated with the V1M and V2M 110a and 110b, respectively. The S1 and S2 counters 204a and 204b are incremented by the counter controller 202 upon reception of the first through third sets of TAs, and the fourth through sixth sets of TAs, by the counter control circuit 112, respectively. When the first through third sets of TAs are received, the S1 counter 204a has first through third values, respectively, and when the fourth through sixth sets of TAs are received, the S2 counter 204b has fourth through sixth values, respectively. The counter controller 202 generates the first control signal CS1 and provides the first control signal CS1 and the first through sixth values to the transaction table control circuit 114.

The O1 and O2 counters 206a and 206b are associated with the V1M and V2M 110a and 110b, respectively. The O1 and O2 counters 206a and 206b are incremented by the counter controller 202 when the first through sixth TS flags are set, i.e., when each of the first through third sets of data packets and the fourth through sixth sets of data packets is transmitted to the master device 102 (i.e., to the V1M and V2M 110a and 110b, respectively). In one example, when the first TS flag is set, the counter controller 202 increments the O1 counter 206a.

Referring now to FIG. 3A, a block diagram of the transaction table control circuit 114 in accordance with an embodiment of the present invention is shown. The transaction table control circuit 114 includes the transaction table 302 and a transaction table controller 304.

The transaction table 302 includes a set of entries for storing a corresponding set of TAs. In one example, the transaction table 302 includes first through sixth entries 306-316 (shown in FIG. 3B) to store the first through sixth sets of TAs, respectively. Each entry is identified using an entry address, i.e., a TID of the associated transaction. Thus, the first through sixth entries 306-316 have the first through sixth TIDs as entry addresses, respectively. In one embodiment, the transaction table 302 is implemented using flip-flops.

The transaction table controller 304 is connected to the transaction table 302 for determining the accessibility of the transaction table 302. Based on the determination, the transaction table controller 304 generates and provides first and second indication signals IN1 and IN2 (that collectively form the status signal SS), to the master device 102. The first indication signal IN1 indicates whether the set of entries is occupied. In one embodiment, when the transaction table 302 is inaccessible, the first indication signal IN1 is set to '1'. The second indication signal IN2 represents an entry address of an entry that is unoccupied. In one example, the second indication signal IN2 indicates that the fourth entry is accessible. Thus, before initiating a transaction, the master device 102 checks whether the transaction table 302 is accessible based on the status signal SS.

The transaction table controller 304 further receives from the transaction table 302, the first through sixth TS flags corresponding to each entry of the transaction table 302. An entry having the least value of entry address (i.e., a TID) and a corresponding TS flag set, is determined by the transaction table controller 304. An entry address (i.e., a TID) of the determined entry is provided to the master device 102. The master device 102 initiates an associated transaction upon receiving the entry address. If the status signal SS indicates inaccessibility of the transaction table 302, the master device 102 waits until the status signal SS indicates accessibility of the transaction table 302 for initiating the set of transactions.

The transaction table controller 304 is connected to the counter control circuit 112 for receiving the first control signal CS1, the first through sixth sets of TAs, and the first through sixth values. The transaction table controller 304 associates the first through sixth values with the first through sixth sets of TAs, respectively, and stores the first through sixth values in the first through sixth entries 306-316, respectively. The first through sixth sets of TAs are saved in the transaction table 302 with the first through sixth TIDs, respectively. The transaction table controller 304 also provides the first through sixth values to the transaction execution circuit 116.

The transaction table controller 304 sets the first through sixth RS flags based on the first control signal CS1. The transaction table controller 304 also receives the second control signal CS2 and sets the first through sixth TS flags.

Referring now to FIG. 3B, the transaction table 302 in accordance with an embodiment of the present invention is shown. The transaction table 302 includes rows that indicate the first through sixth entries 306-316. The transaction table 302 also includes a TID column 318, a TS flag column 320, a VMID column 322, a seq_cnt column 324, a burst length column 326, a burst size column 328, and an RS flag column 330. The TID column 318 of the first through sixth entries 306-316 includes the first through sixth TIDs T1-T6, respectively.

The TS flag column 320 of the first through sixth entries 306-316 includes the first through sixth TS flags, respectively. When the first through sixth TS flags are low (binary "0"), it indicates that the first through sixth sets of data packets are yet to be transmitted to the master device 102.

The VMID column 322 of the first through third entries 306-310 (hereinafter referred to as "first through third VMIDs") is low to indicate the association of the first through third TIDs T1-T3 with the V1M 110a, respectively. Similarly, the VMID column 322 of the fourth through sixth entries 312-316 (hereinafter referred to as "fourth through sixth VMIDs") is high (set to "1") to indicate the association of the fourth through sixth TIDs T4-T6 with the V2M 110b.

The seq_cnt column 324 indicates a current value of each of the S1 and S2 counters 204a and 204b, when each of the first through sixth transactions is initiated. Thus, the seq_cnt column 324 of the first through sixth entries 306-316 includes the first through sixth values, respectively. In one example, the first through third transactions are initiated in order, thus, the first through third values are 0, 1, and 2, respectively. Similarly, the fourth through sixth values are 0, 1, and 2, respectively. The burst length column 326 indicates a burst length (i.e., a number of data packets) of each of the first through sixth sets of data packets. In one example, first through sixth burst lengths of the burst length column 326 for the first through sixth entries 306-316 are 8, 8, 8, 16, 16, and 16, respectively.

The burst size column 328 indicates a burst size (i.e., a number of data bytes in each data packet) of the first through sixth sets of data packets. In one example, first through sixth burst sizes of the burst size column 328 for the first through sixth entries 306-316 are 1, 2, 1, 1, 1, and 2, respectively. The RS flag column 330 of the first through sixth entries 306-316 includes the first through sixth RS flags, respectively. When the first through sixth RS flags are low (set to "0"), it indicates that the first through sixth sets of data packets are yet to be received.

Although it is shown that the transaction table 302 includes the aforementioned columns 318-330, the table 302 is not necessarily so limited. For example, the transaction table 302 may include other TAs based on the AXI protocol without deviating from the scope of the present invention.

Figure 4:
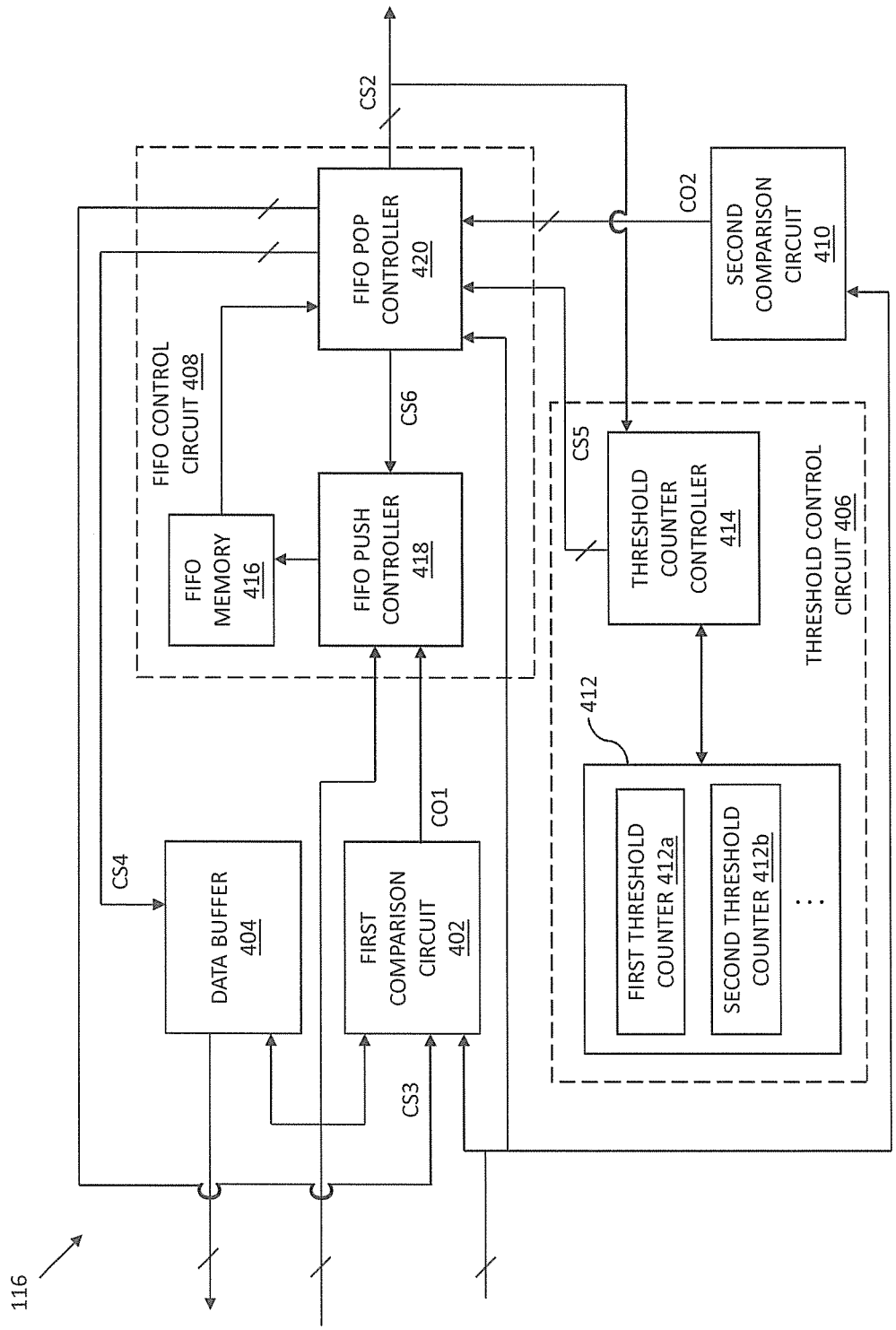
FIG. 4 is a block diagram of a transaction execution circuit of the transaction controller of FIG. 1 in accordance with an embodiment of the present invention.

Referring now to FIG. 4, a block diagram of the transaction execution circuit 116 in accordance with an embodiment of the present invention is shown. The transaction execution circuit 116 includes a first comparison circuit 402, a data buffer 404, a threshold control circuit 406, a first-in-first-out (FIFO) control circuit 408, and a second comparison circuit 410.

The first comparison circuit 402 is connected to the counter control circuit 112 for receiving the first through sixth TIDs and a current value of each of the O1 and O2 counters 206a and 206b. The first comparison circuit 402 is further connected to the transaction table control circuit 114 for receiving the first through sixth VMIDs, the first through sixth RS flags, and the first through sixth values. In one example, when the first set of data packets is received along with the first TID, the first comparison circuit 402 receives the first value.

The first comparison circuit 402 further receives a third control signal CS3. The third control signal CS3 is indicative of a VM corresponding to a previously transmitted set of data packets by the transaction controller 108. The VM corresponding to the previously transmitted set of data packets is hereinafter referred to as "previous VM". In one embodiment, the third control signal CS3 is a multi-bit signal having a set of bits that represent the previous VM. In one example, the first set of data packets is transmitted before the reception of the fourth TID. Thus, the set of bits represent the V1M 110a as the previous VM. The first comparison circuit 402 generates a first comparison signal CO1, which indicates whether a received TID is to be pushed onto a FIFO memory 416 of the FIFO control circuit 408. The first comparison circuit 402 is explained in detail in conjunction with FIG. 5.

The data buffer 404 is connected to the counter control circuit 112 for receiving the first through sixth sets of data packets and the first through sixth TIDs. The data buffer 404 is abstracted into a set of memory blocks (shown in FIGS. 6A-6G). Each memory block has a memory address equal to a TID. Thus, first through sixth memory blocks have the first through sixth TIDs as memory addresses for storing the first through sixth sets of data packets, respectively. Further, a number of memory blocks is equal to a number of entries in the transaction table 302.

The data buffer 404 further receives a fourth control signal CS4 that is indicative of an address of the memory block. Based on the fourth control signal CS4, the data buffer 404 transmits a stored set of data packets to the master device 102. In one embodiment, the fourth control signal CS4 is a multi-bit signal having a set of bits that represent a TID for which the set of data packets is to be transmitted to the master device 102. In one example, the fourth control signal CS4 represents the fifth TID. Thus, a set of data packets stored in the fifth memory block, i.e., the fifth set of data packets, is to be transmitted by the data buffer 404 to the master device 102.

The threshold control circuit 406 includes a set of threshold counters 412 of which first and second threshold counters 412a and 412b (hereinafter referred to as "TH1 and TH2 counters 412a and 412b", respectively) are shown, and a threshold counter controller 414. In one embodiment, each threshold counter is an up-counter. The TH1 and TH2 counters 412a and 412b are associated with the V1M and V2M 110a and 110b, respectively. Each threshold counter 412 is initialized to zero when the SoC 100 is powered-ON.

The TH1 and TH2 counters 412a and 412b are incremented for each transmission of a set of data packets corresponding to the V1M and V2M 110a and 110b, respectively. Thus, the TH1 counter 412a is incremented when each of the first through third sets of data packets is transmitted to the V1M 110a, and the TH2 counter 412b is incremented when each of the fourth through sixth sets of data packets is transmitted to the V2M 110b.

The threshold counter controller 414 receives the second control signal CS2 and increments the TH1 and TH2 counters 412a and 412b. When final values of each of the TH1 and TH2 counters 412a and 412b (hereinafter referred to as "FTH1 and FTH2 values", respectively) exceed first and second threshold counts, which are associated with the TH1 and TH2 counters 412a and 412b, respectively, the threshold counter controller 414 resets the TH1 and TH2 counters 412a and 412b, and generates a fifth control signal CS5. In one embodiment, the fifth control signal CS5 is a multi-bit signal having a number of bits based on a number of threshold counters associated with the master device 102. Each bit thus indicates whether a final value of a threshold counter has exceeded the corresponding threshold count.

The threshold counter controller 414 determines the previous VM based on the second control signal CS2, and further resets the TH1 and TH2 counters 412a and 412b. In one example, the second control signal CS2 indicates that a set of data packets associated with the V2M 110b has been transmitted. The threshold counter controller 414 thus resets the TH1 counter 412a and increments the TH2 counter 412b.

The FIFO control circuit 408 is connected to the counter control circuit 112, the first comparison circuit 402, and the threshold control circuit 406 for receiving the first through sixth TIDs, the first comparison signal CO1, and the fifth control signal CS5, respectively. The FIFO control circuit 408 generates the fourth control signal CS4 for transmission of each of the first through sixth sets of data packets to the master device 102. The FIFO control circuit 408 includes the FIFO memory 416, a FIFO push controller 418, and a FIFO pop controller 420.

The FIFO memory 416 stores at least one of the first through sixth TIDs on a FIFO basis. In one embodiment, the FIFO memory 416 includes read and write pointers (not shown). The write pointer points to an empty memory location in the FIFO memory 416 for writing a TID, and the read pointer points to a memory location that includes a TID that was received before the remaining TIDs already stored in the FIFO memory 416. The memory location that stores the TID that is received before the remaining TIDs is hereinafter referred to as "a top location".

The FIFO push controller 418 is connected to the counter control circuit 112 and the first comparison circuit 402 for receiving the first through sixth TIDs and the first comparison signal CO1, respectively. The FIFO push controller 418 pushes at least one of the first through sixth TIDs in the FIFO memory 416 based on the first comparison signal CO1. In one example, when the fourth TID is received and the first comparison signal CO1 is high, the fourth TID is pushed in the FIFO memory 416. In another example, when the third TID is received and the first comparison signal CO1 is low, the third TID is not pushed in the FIFO memory 416.

The FIFO pop controller 420 is connected to the FIFO memory 416 and the transaction table control circuit 114 for receiving a TID stored at the top location and the first through sixth VMIDs, respectively. The FIFO pop controller 420 identifies a VM associated with the received TID and generates the third control signal CS3 to indicate the identified VM as the previous VM.

The FIFO pop controller 420 generates the fourth control signal CS4 for transmission of a set of data packets corresponding to the received TID (i.e., the first set of data packets corresponding to the first TID). On generating the fourth control signal CS4, the FIFO pop controller 420 further generates the second control signal CS2 to indicate the transmission of the set of data packets corresponding to the received TID.

The FIFO pop controller 420 further receives a second comparison signal CO2 that is indicative of the presence of a next TID in the FIFO memory 416 such that the next TID corresponds to a subsequent transaction associated with the previous VM. The FIFO pop controller 420 generates the fourth control signal CS4 for transmitting a set of data packets corresponding to the next TID, to the master device 102. In one example, when the first set of data packets is transmitted to the V1M 110a, the next TID is the second TID. The FIFO pop controller 420 thus generates the fourth control signal CS4 for transmitting the second set of data packets to the master device 102.

The FIFO pop controller 420 further receives the fifth control signal CS5. The fifth control signal CS5 indicates that a final value of a threshold counter (one of TH1 and TH2 counters 412a and 412b) associated with the previous VM has exceeded the corresponding threshold count. In one example, the next TID is the third TID. However, the fifth control signal CS5 indicates that the FTH1 value has exceeded the first threshold count. The FIFO pop controller 420 generates a sixth control signal CS6 to indicate the next TID when the fifth control signal CS5 is generated. The next TID is pushed in the FIFO memory 416 based on the sixth control signal CS6. Further, the FIFO pop controller 420 determines whether a TID associated with any other VM (such as the V2M 110*b*) is received. If a TID associated with the V2M 110*b* is received, the FIFO pop controller 420 transmits a set of data packets associated with the TID of the V2M 110*b*.

The FIFO push controller 418 is further connected to the FIFO pop controller 420 for receiving the sixth control signal CS6. In one example, the next TID (i.e., the third TID) is pushed in the FIFO memory 416 based on the sixth control signal CS6.

The second comparison circuit 410 is connected to the transaction table control circuit 114 for receiving the first through sixth sets of TAs. Based on the first through sixth sets of TAs, the second comparison circuit 410 generates the second comparison signal CO2 to indicate whether the next TID for the previous VM has been received by the counter control circuit 112. In one embodiment, the second comparison circuit 410 includes a set of multiplexers (MUXs) (not shown) and a set of comparators (not shown) for checking the reception of the next TID.

Figure 5:
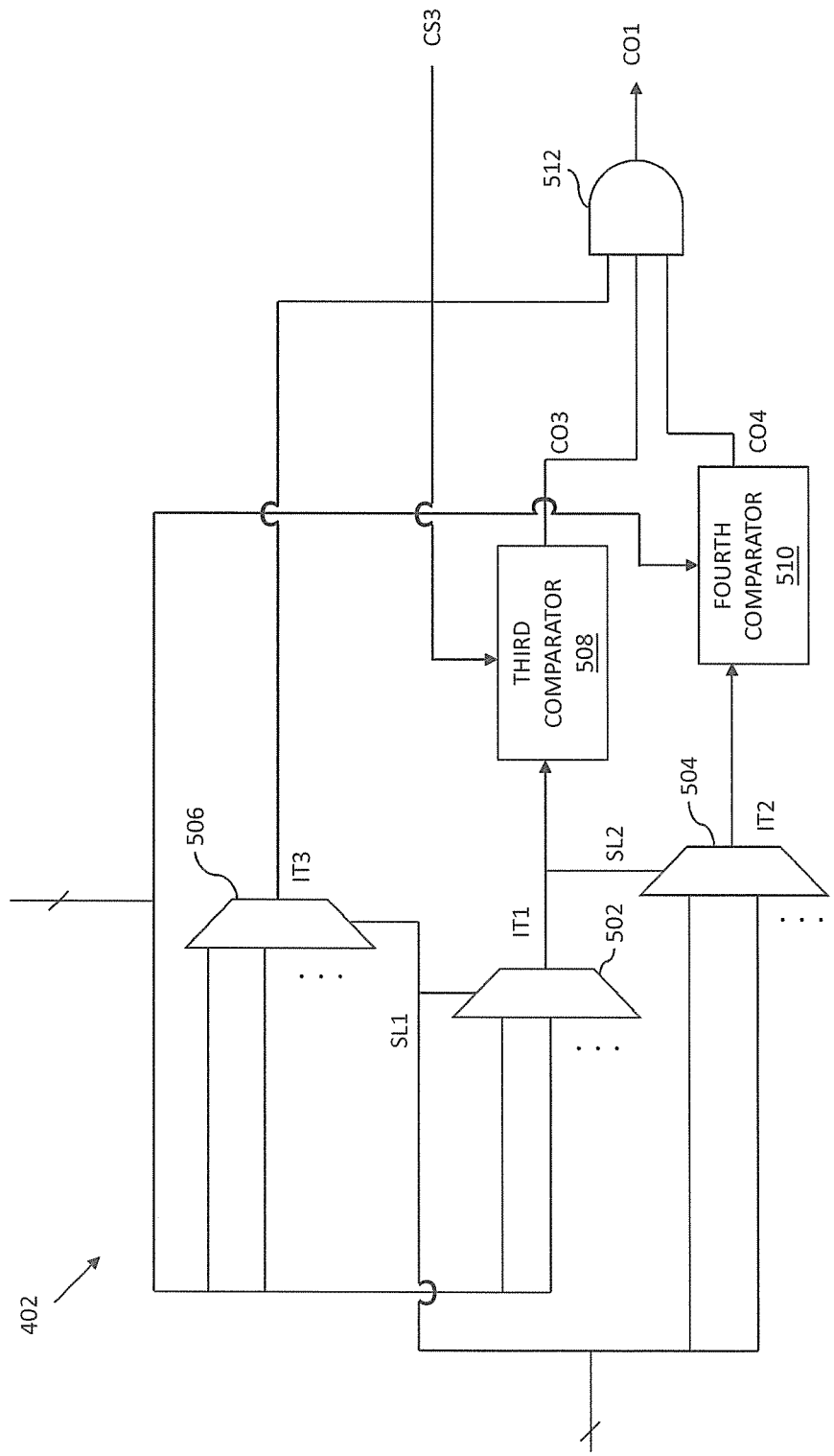
FIG. 5 is a block diagram of a first comparison circuit of the transaction execution circuit of FIG. 4 in accordance with an embodiment of the present invention.

Referring now to FIG. 5, a block diagram of the first comparison circuit 402 in accordance with an embodiment of the present invention is shown. The first comparison circuit 402 includes first through third MUXs 502-506, third and fourth comparators 508 and 510, and a logic gate 512.

The first MUX 502 is connected to the transaction table control circuit 114 for receiving the VMIDs (such as the first and second VMIDs). The first MUX 502 also is connected to the counter control circuit 112 for receiving one of the first through sixth TIDs as a first select signal SL1. Based on the first select signal SL1 and the VMIDs, the first MUX 502 outputs a first intermediate signal IT1. In one example, when the first TID is the first select signal SL1, the first intermediate signal IT1 is the first VMID.

The second MUX 504 is connected to the counter control circuit 112 for receiving a current value of each ordering counter (such as current values of the O1 and O2 counters 206*a* and 206*b*). The second MUX 504 also is connected to the first MUX 502 for receiving the first intermediate signal IT1 as a second select signal SL2. Based on the second select signal SL2 and the current values, the second MUX 504 outputs a second intermediate signal IT2. In an example, when the first VMID is provided as the second select signal SL2, the second intermediate signal IT2 is the current value of the O1 counter 206*a*.

The third MUX 506 is connected to the transaction table control circuit 114 for receiving the RS flags (such as the first and second RS flags). The third MUX 506 also is connected to the counter control circuit 112 for receiving one of the first through sixth TIDs as the first select signal SL1. Based on the first select signal SL1 and the first and second RS flags, the third MUX 506 outputs a third intermediate signal IT3. The third intermediate signal IT3 is high when an RS flag corresponding to the first select signal SL1 is set to the first bit (i.e., equal to binary "1").

The third comparator 508 is connected to the first MUX 502 and the FIFO pop controller 420 for receiving the first intermediate signal IT1 and the third control signal CS3, respectively, and outputting a third comparison signal CO3. The third comparison signal CO3 is high when a VM represented by the first intermediate signal IT1 is different from a previous VM represented by the third control signal CS3.

The fourth comparator 510 is connected to the second MUX 504 and the transaction table control circuit 114 for receiving the second intermediate signal IT2 and one of the first through sixth values based on the first through sixth TIDs, respectively. In an example, when the first TID is provided as the first select signal SL1, the fourth comparator 510 receives the first value. Based on the second intermediate signal IT2 and one of the first through sixth values, the fourth comparator 510 outputs a fourth comparison signal CO4. The fourth comparison signal CO4 is high when a current value of an ordering counter represented by the second intermediate signal IT2 is equal to one of the first through sixth values associated with the first select signal SL1.

The logic gate 512 is connected to the third MUX 506 and the third and fourth comparators 508 and 510 for receiving the third intermediate signal IT3 and the third and fourth comparison signals CO3 and CO4, respectively. The logic gate 512 outputs the first comparison signal CO1. In one embodiment, the logic gate 512 is an AND gate. When the first comparison signal CO1 is high, the received TID (i.e., the TID received as the first select signal SL1) is pushed in the FIFO memory 416. When the first comparison signal CO1 is low, the received TID is not pushed in the FIFO memory 416.

Referring now to FIGS. 6A-6G, a block diagram that illustrates an operation of the SoC 100 in accordance with an embodiment of the present invention is shown. For the sake of simplicity and without deviating from the scope of the present invention, it is assumed that the first transaction is initiated before the second and third transactions and the second transaction is initiated before the third transaction. Similarly, the fourth transaction is initiated before the fifth and sixth transactions and the fifth transaction is initiated before the sixth transaction. Thus, the slave device 106 receives the first through sixth RAs and the first through sixth TIDs. Further, the fourth set of data packets is transmitted before the first set of data packets. In the currently preferred embodiment, the slave device 106 transmits the first through third sets of data packets out-of-order, i.e., the second set of data packets is transmitted before the first set of data packets.

In this example, the data buffer 404 includes first through sixth memory blocks 404*a*-404*f* having the first through sixth TIDs T1-T6 as corresponding memory addresses, respectively, and the first and second threshold counts are equal to "2". The FIFO memory 416 has first through sixth locations 416*a*-416*f*. Before the reception of the second and fourth sets of data packets by the transaction controller 108, the current values of the O1 and O2 counters 206*a* and 206*b* and the TH1 and TH2 counters 412*a* and 412*b* are zero. The TID column 318, the TS flag column 320, the VMID column 322, the seq_cnt column 324, and the RS flag column 330 for the first through sixth entries 306-316 are shown in FIGS. 6A-6G.

Figure 6A:
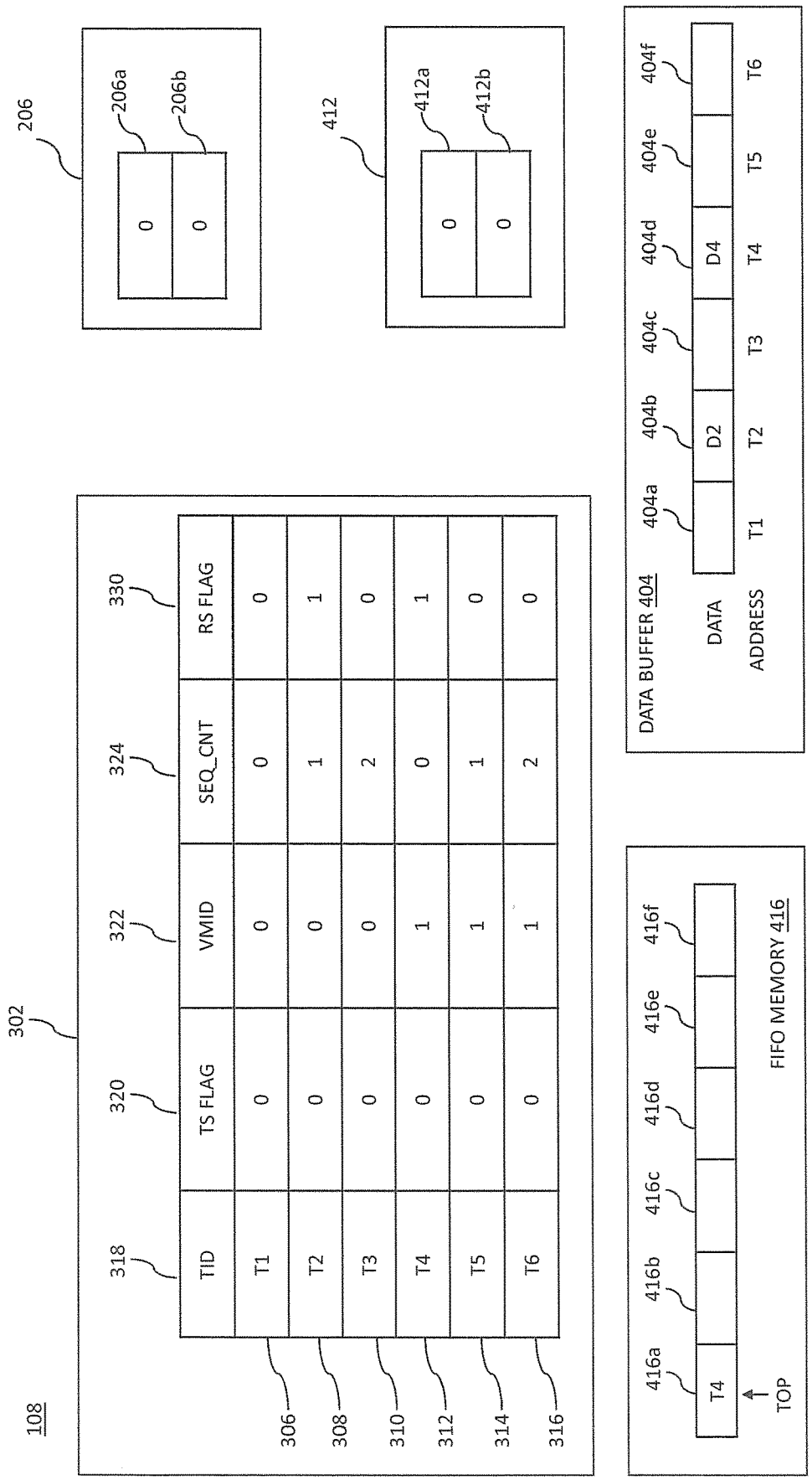
FIGS. 6A-6G illustrate states of various data structures, such as a transaction table, a FIFO memory, a counter and a data buffer of the SoC of FIG. 1 in conjunction with an example operation of the SoC of FIG. 1.

Referring now to FIG. 6A, a block diagram that illustrates the reception of the second and fourth sets of data packets D2 and D4 by the transaction controller 108 in accordance with an embodiment of the present invention is shown. The second and fourth RS flags are thus set and the second and fourth sets of data packets D2 and D4 are stored in the second and fourth memory blocks 404*b* and 404*d*, respectively. Further, the first comparison circuit 402 compares the second value (i.e., "1") with a current value of the O1 counter 206*a* (i.e., "0"), and generates a first comparison signal CO1 (in this case a low comparison signal is generated) to indicate the inequality of the second value with the current value. Thus, the second TID T2 is not pushed in the FIFO memory 416.

The first comparison circuit 402 further compares the fourth value (i.e., "0") with a current value of the O2 counter 206*b* (i.e., "0"), and generates a high first comparison signal CO1 to indicate the equality of the fourth value with the current value. Thus, the fourth TID T4 is pushed in the first location 416a (which is the top location).

Figure 6B:
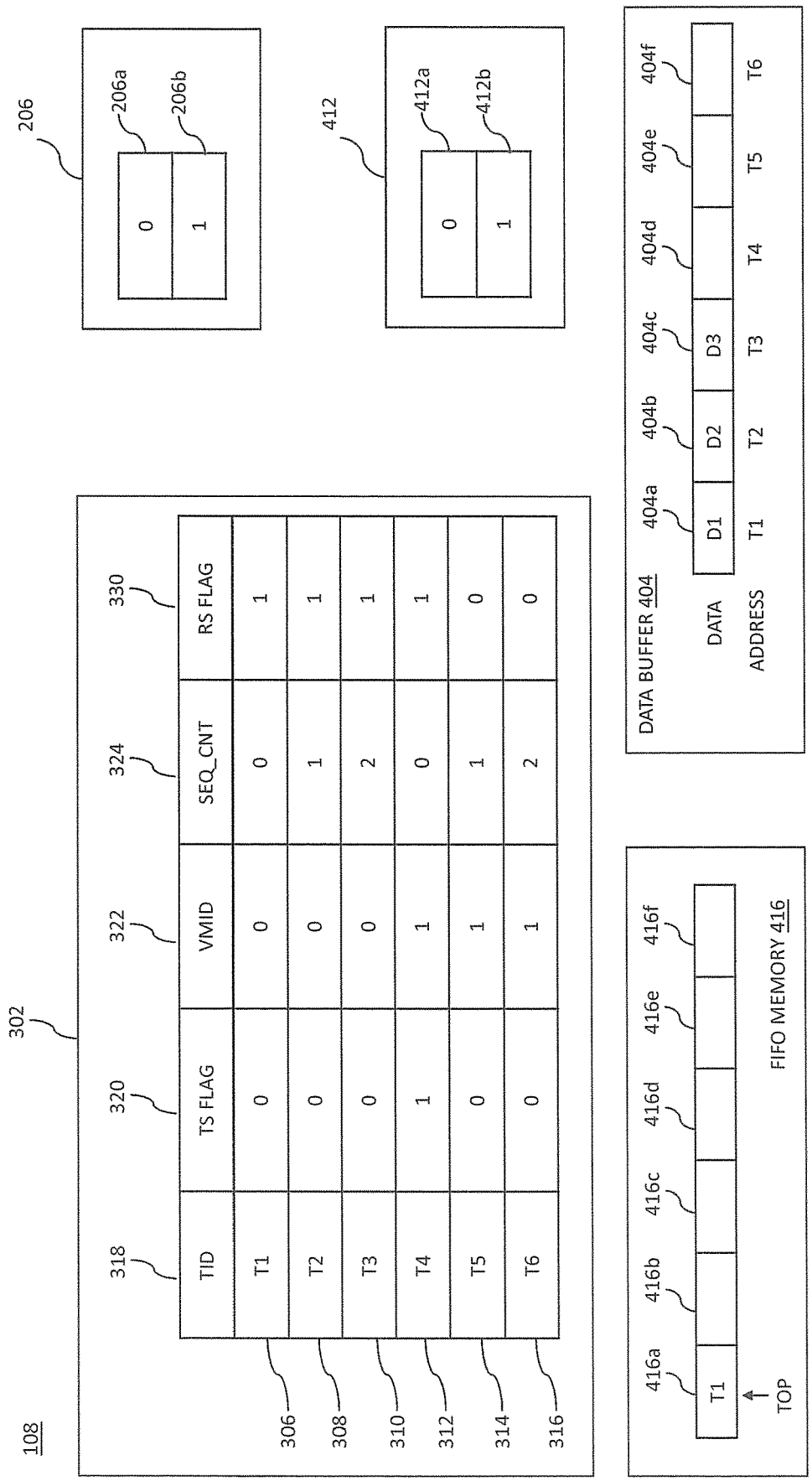

Referring now to FIG. 6B, a block diagram that illustrates the transmission of the fourth set of data packets D4, and the reception of the first and third sets of data packets D1 and D3 by the transaction controller 108 in accordance with an embodiment of the present invention is shown.

The FIFO pop controller 420 receives a TID stored at the top location of the FIFO memory 416 (i.e., the fourth TID T4 stored at the first location 416a) and generates the second through fourth control signals CS2-CS4. The third control signal CS3 indicates the V2M 110b as the previous VM. Based on the fourth control signal CS4, the fourth set of data packets D4 is transmitted to the master device 102. Based on the second control signal CS2, the transaction table control circuit 114 sets the fourth TS flag. Further, the O2 and TH2 counters 206b and 412b are incremented to a value of "1". The FIFO pop controller 420, based on the second comparison signal CO2, checks whether the next TID for the previous VM (i.e., V2M 110b) has been received. If the next TID (i.e., the fifth TID T5) has not been received, the fourth TID T4 is erased from the first location 416a.

The counter control circuit 112 receives the first and third sets of data packets D1 and D3. The first and third sets of data packets D1 and D3 are stored in the first and third memory blocks 404a and 404c, respectively. Further, the first and third RS flags are set. The first comparison circuitry 402 receives the third control signal CS3, and compares the first value (i.e., "0") with a current value of the O1 counter 206a (i.e., "0"), and generates a high first comparison signal CO1. Thus, the FIFO push controller 418 pushes the first TID T1 in the first location 416a.

The first comparison circuit 402 further compares the third value (i.e., "2") with a current value of the O1 counter 206a (i.e., "0"), and generates a low first comparison signal CO1. Thus, the FIFO push controller 418 does not push the third TID T3 in the FIFO memory 416.

Figure 6C:
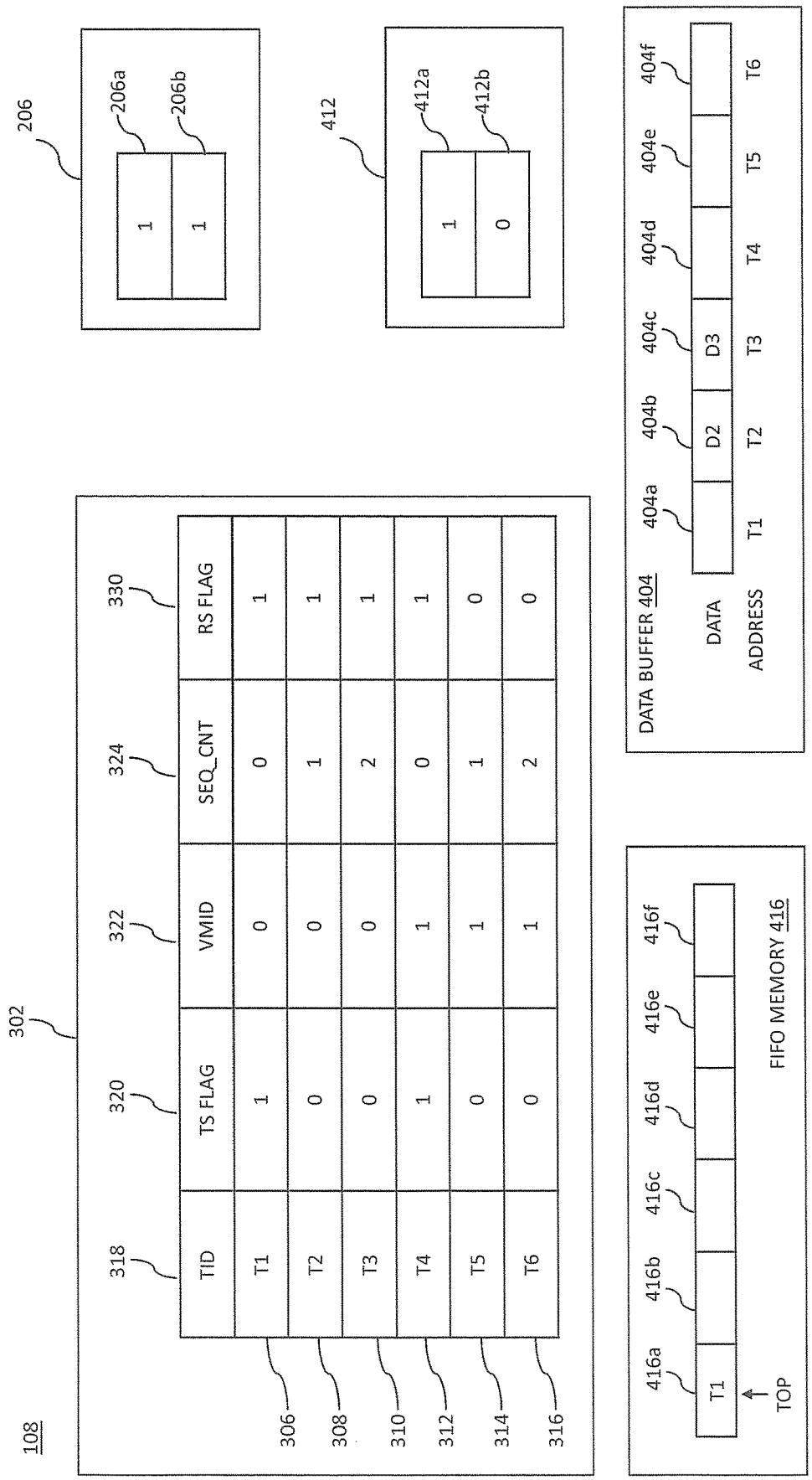

Referring now to FIG. 6C, a block diagram illustrating the transmission of the first set of data packets D1 by the transaction controller 108 in accordance with an embodiment of the present invention is shown.

The FIFO pop controller 420 receives the first TID T1, which is stored at the top location (i.e., the first location 416a), and generates the second through fourth control signals CS2-CS4. Based on the fourth control signal CS4, the first set of data packets D1 is transmitted to the master device 102. The third control signal CS3 indicates the V1M 110a as the previous VM. Based on the second control signal CS2, the transaction table control circuitry 114 sets the first TS flag to binary "1". Further, the O1 and TH1 counters 206a and 412a are incremented to a value of "1" and the TH2 counter 412b is reset.

Figure 6D:
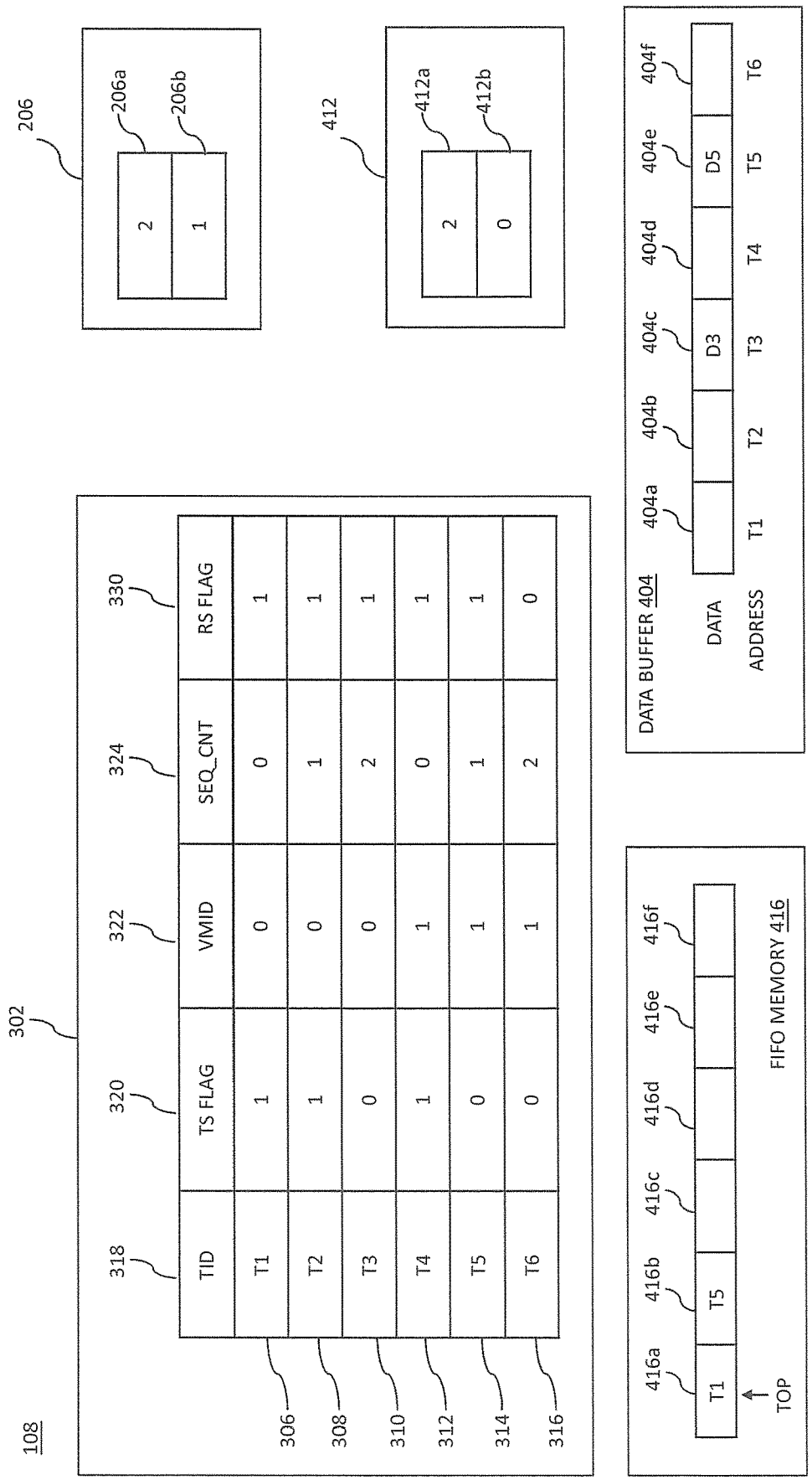

Referring now to FIG. 6D, a block diagram illustrating transmission and reception of the second and fifth sets of data packets D2 and D5 by the transaction controller 108, respectively, in accordance with an embodiment of the present invention is shown.

Based on the second comparison signal CO2, the FIFO pop controller 420 checks whether the next TID for the previous (i.e., V1M 110a) has been received. If the next TID (i.e., the second TID T2) has been received, the first TID T1 is retained in the FIFO memory 416 (i.e., at the top location) and the FIFO pop controller 420 generates the second through fourth control signals CS2-CS4. The second set of data packets D2 is transmitted to the master device 102 based on the fourth control signal CS4. Further, the transaction table control circuit 114 sets the second TS flag based on the second control signal CS2. Thus, the O1 and TH1 counters 206a and 412a are incremented to a value of "2".

The counter control circuit 112 receives the fifth set of data packets D5. The fifth set of data packets D5 is stored in the fifth memory block 404e and the fifth RS flag is set. The first comparison circuit 402 receives the third control signal CS3, and compares the fifth value (i.e., "1") with a current value of the O2 counter 206b (i.e., "1") and generates a high first comparison signal CO1. Thus, the FIFO push controller 418 pushes the fifth TID T5 in the second location 416b.

Figure 6E:
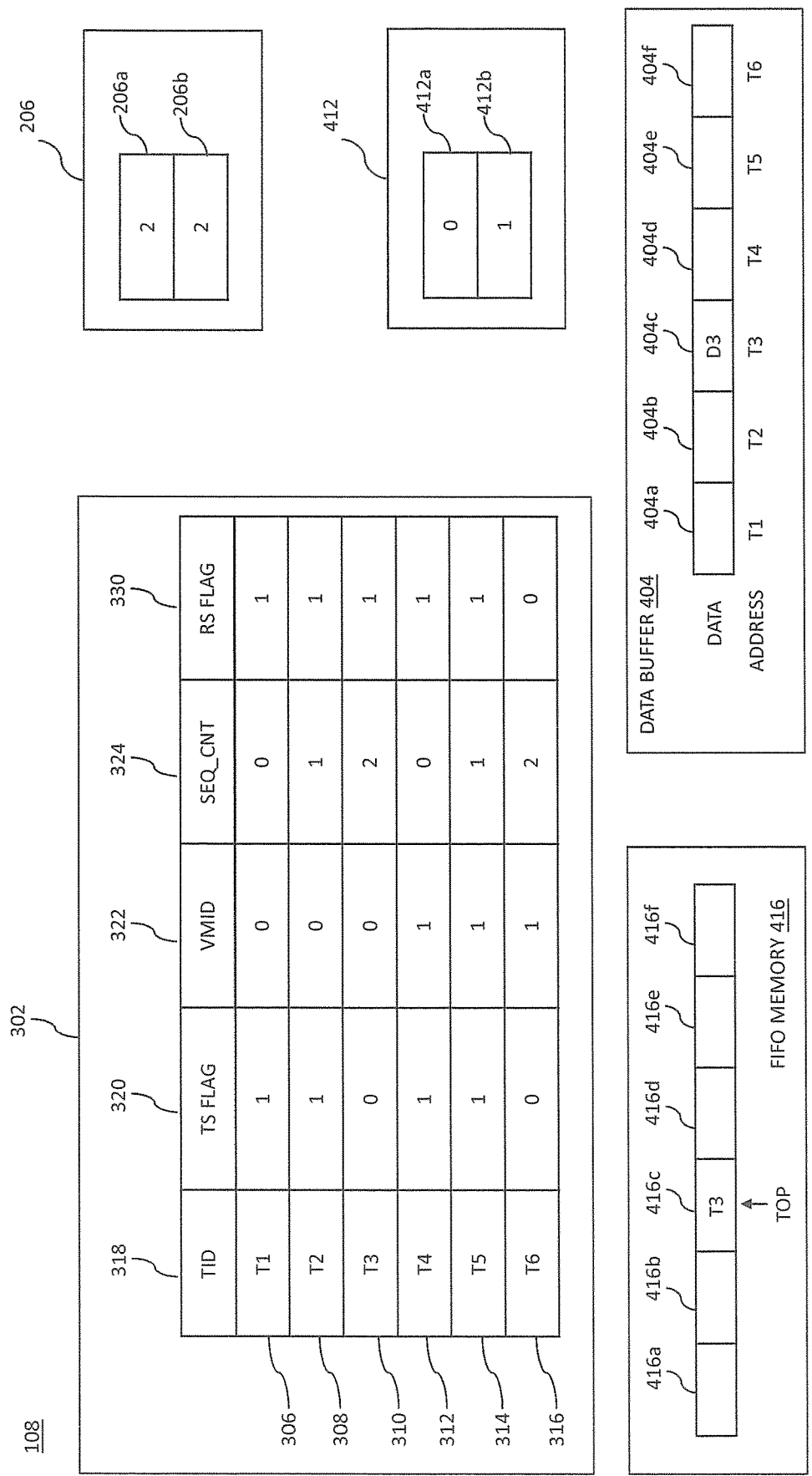

Referring now to FIG. 6E, a block diagram illustrating the transmission of the fifth set of data packets D5 by the transaction controller 108 to the master device 102 in accordance with an embodiment of the present invention is shown.

The FIFO pop controller 420 checks whether the next TID (i.e., the third TID T3) for the previous VM (i.e., the V1M 110a) is received, based on the second comparison signal CO2. Further, as the TH1 counter 412a has exceeded the first threshold count, the first TID T1 is erased from the FIFO memory 416, and the second location 416b is identified as the top location by the FIFO memory 416. The threshold counter controller 414 resets the TH1 counter 412a and generates the fifth control signal CS5. The FIFO pop controller 420 receives the fifth control signal CS5 and generates the sixth control signal CS6. Based on the sixth control signal CS6, the FIFO push controller 418 pushes the third TID T3 in the third location 416c (as the fifth TID T5 is stored in the second location 416b, as illustrated in FIG. 6D). The FIFO pop controller 420 receives a TID stored at the top location (i.e., the fifth TID T5) and generates the second through fourth control signals CS2-CS4.

The FIFO pop controller 420 identifies a VM associated with the fifth TID T5 (i.e., the V2M 110b) to generate the third control signal CS3. Based on the fourth control signal CS4, the fifth set of data packets D5 is transmitted to the master device 102. The transaction table control circuit 114 sets the fifth TS flag based on the second control signal CS2. The O2 and TH2 counters 206b and 412b are incremented to values of "2" and "1", respectively, and the TH1 counter 412a is reset.

The FIFO pop controller 420 checks whether the next TID (i.e., the sixth TID T6) for the previous VM (i.e., the V2M 110b) has been received, based on the second comparison signal CO2. If the second comparison signal CO2 indicates that the sixth TID T6 has not been received, then the fifth TID T5 is erased from the FIFO memory 416, and the third location 416c is identified as the top location.

Figure 6F:
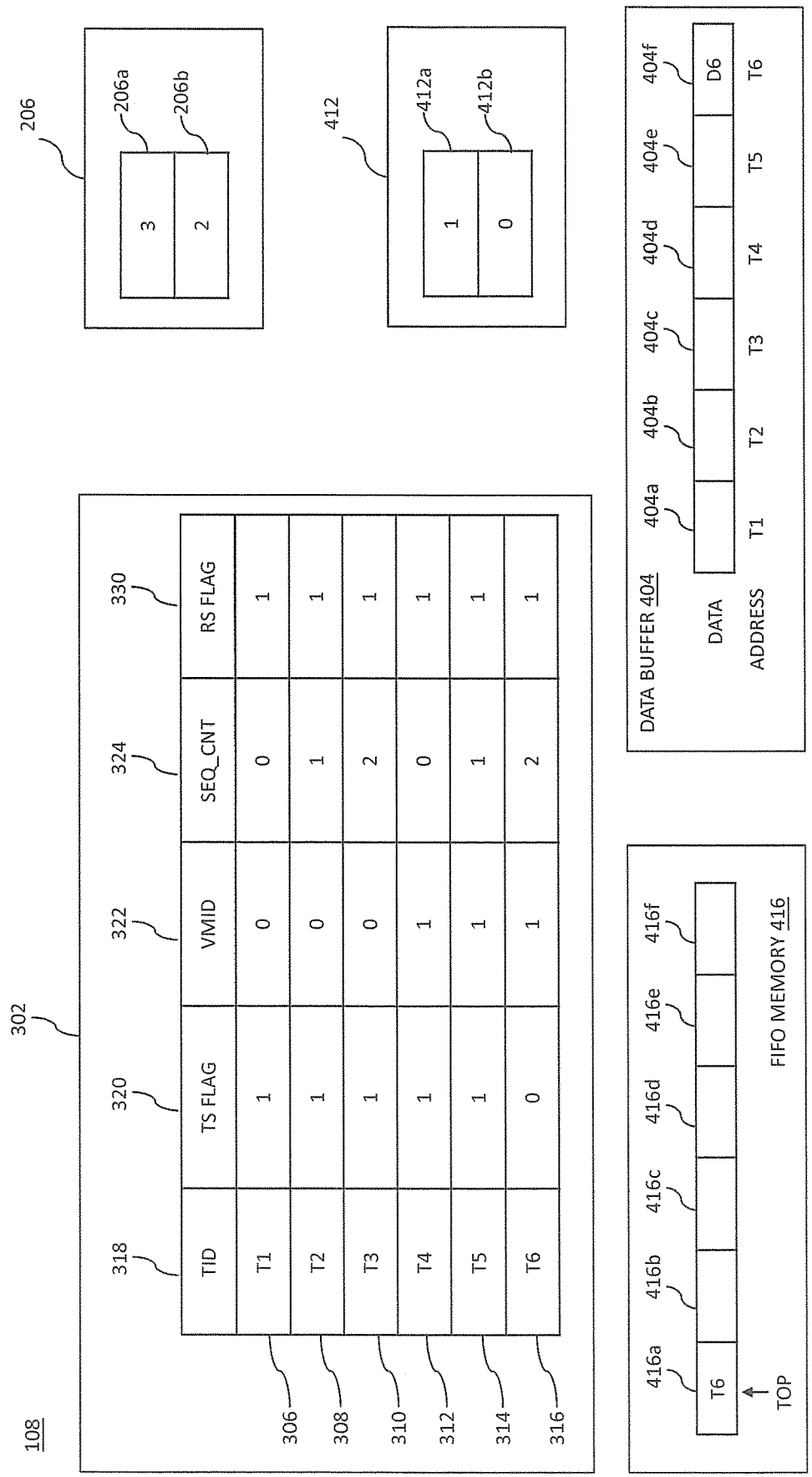

Referring now to FIG. 6F, a block diagram illustrating transmission and reception of the third and sixth sets of data packets D3 and D6 by the transaction controller 108 in accordance with an embodiment of the present invention is shown.

Since the next TID has not been received, the FIFO pop controller 420 receives the third TID T3 and identifies a VM associated with the third TID T3 (i.e., the V1M 110a) to generate the third control signal CS3. Based on the fourth control signal CS4, the third set of data packets D3 is transmitted to the master device 102. Further, the transaction table control circuitry 114, based on the second control signal CS2, sets the third TS flag. The O1 and TH1 counters 206a and 412a are incremented to values of "3" and "1", respectively, and the TH2 counter 412b is reset, and the third TID T3 is erased from the FIFO memory 416.

The counter control circuit 112 receives the sixth set of data packets D6, which is stored in the sixth memory block 404*f* and the sixth RS flag is set. The first comparison circuit 402 compares the sixth value (i.e., "2") with a current value of the O2 counter 206*b* (i.e., "2"), and generates a high first comparison signal CO1. Thus, the FIFO push controller 418 pushes the sixth TID T6 in the top location (i.e., the first location 416*a*).

Figure 6G:
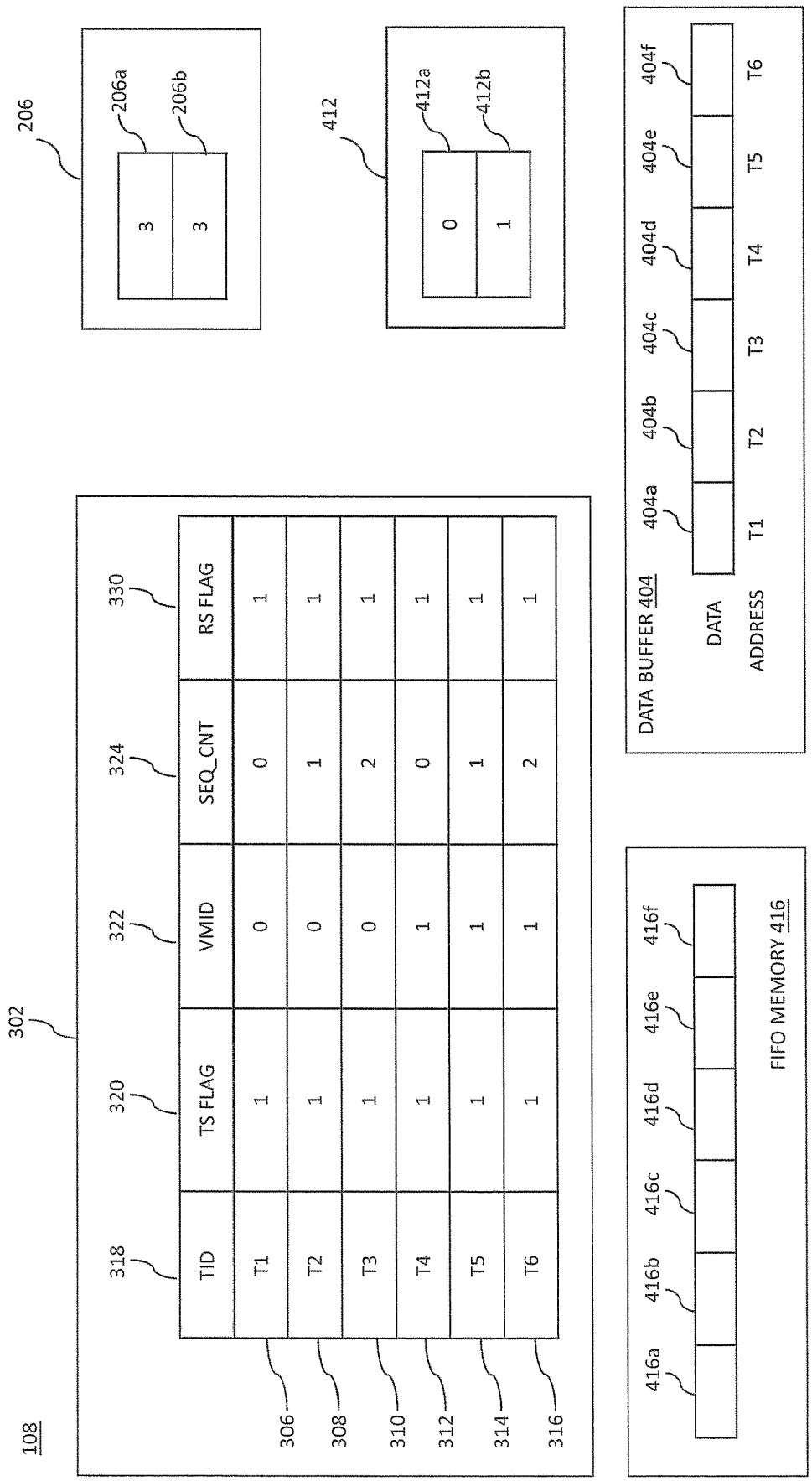
Figure 7A:
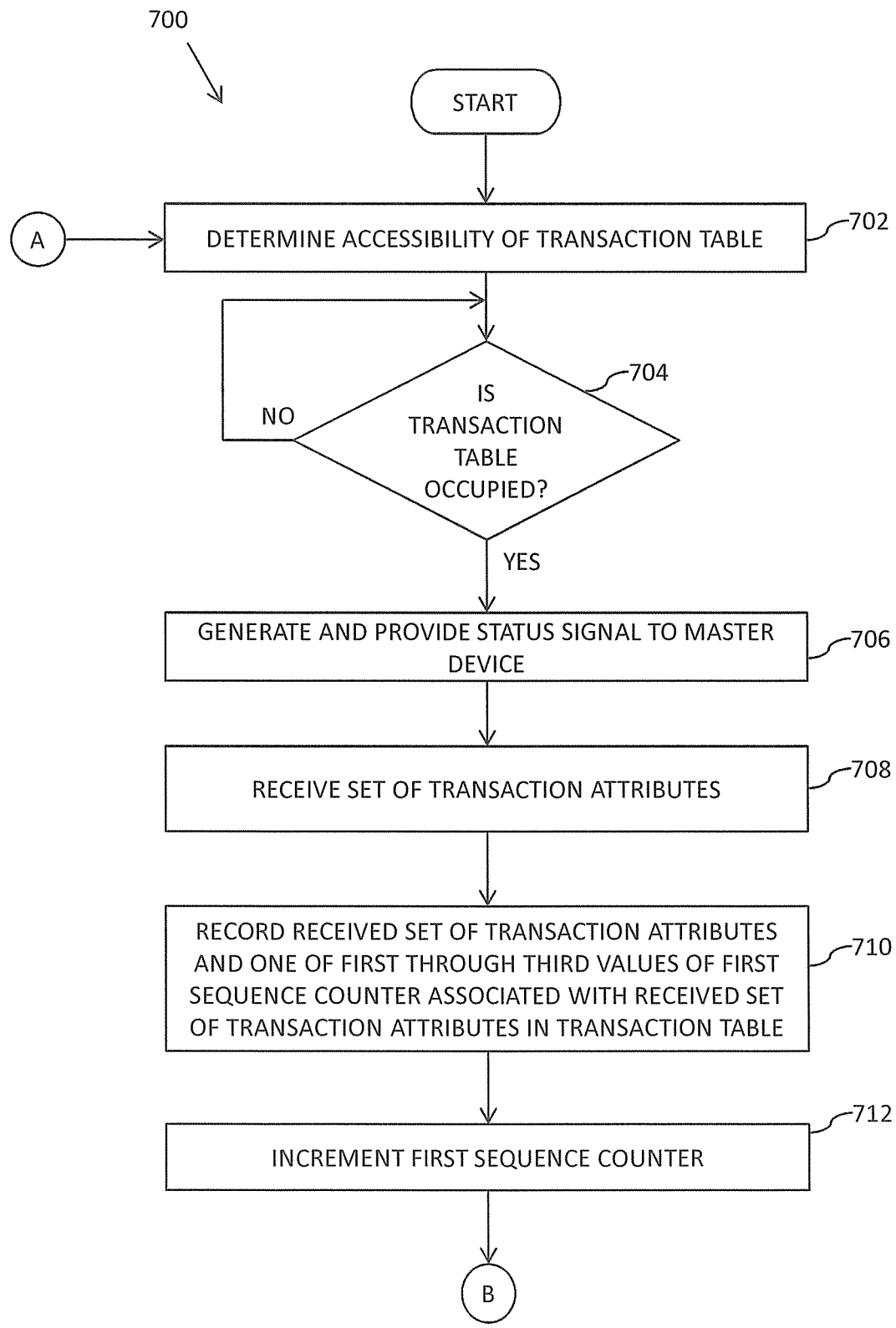
FIGS. 7A-7D illustrate a flow chart of a method for ordering first through third transactions associated with a master device of the SoC of FIG. 1 in accordance with an embodiment of the present invention.
Figure 7B:
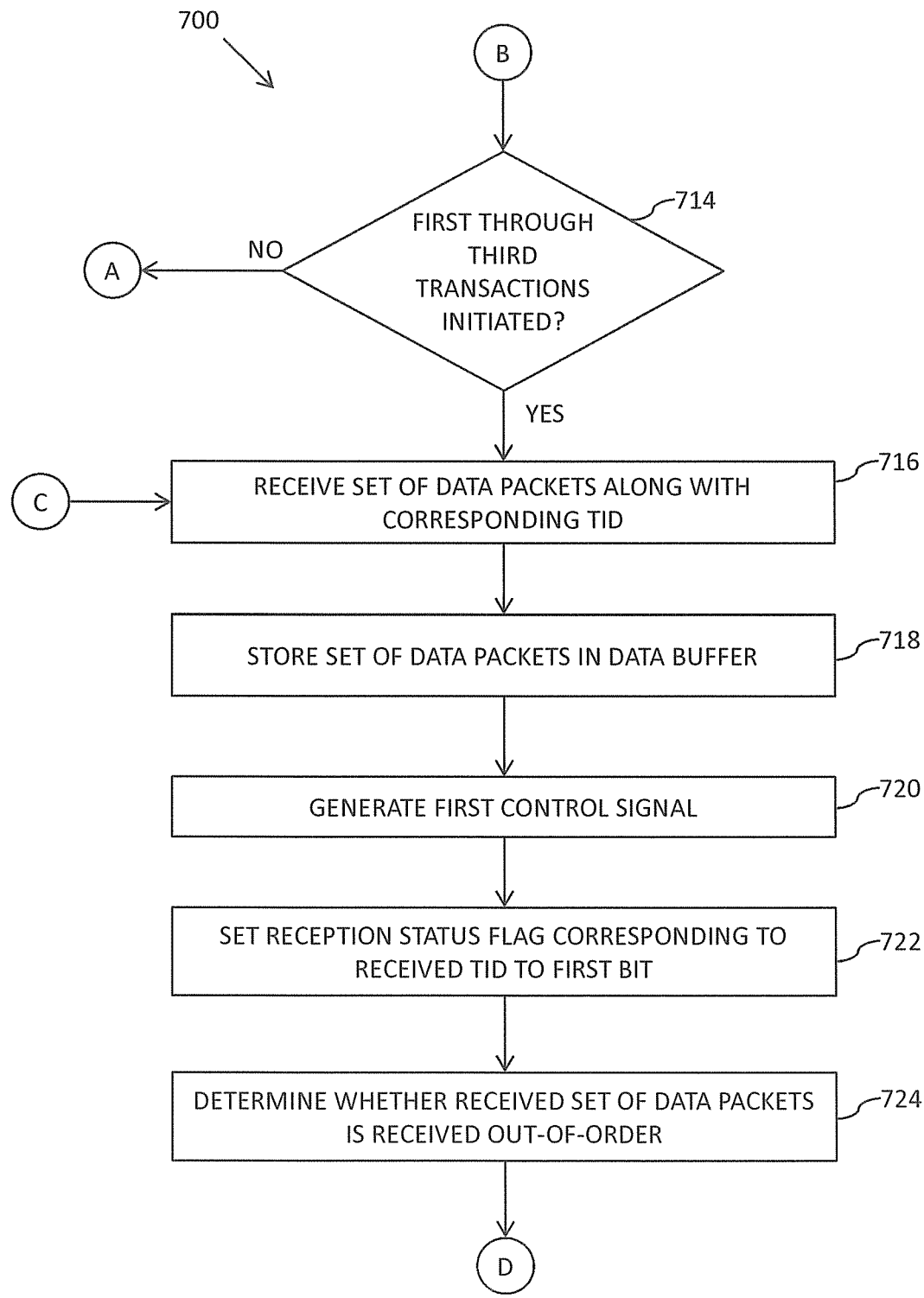
Figure 7C:
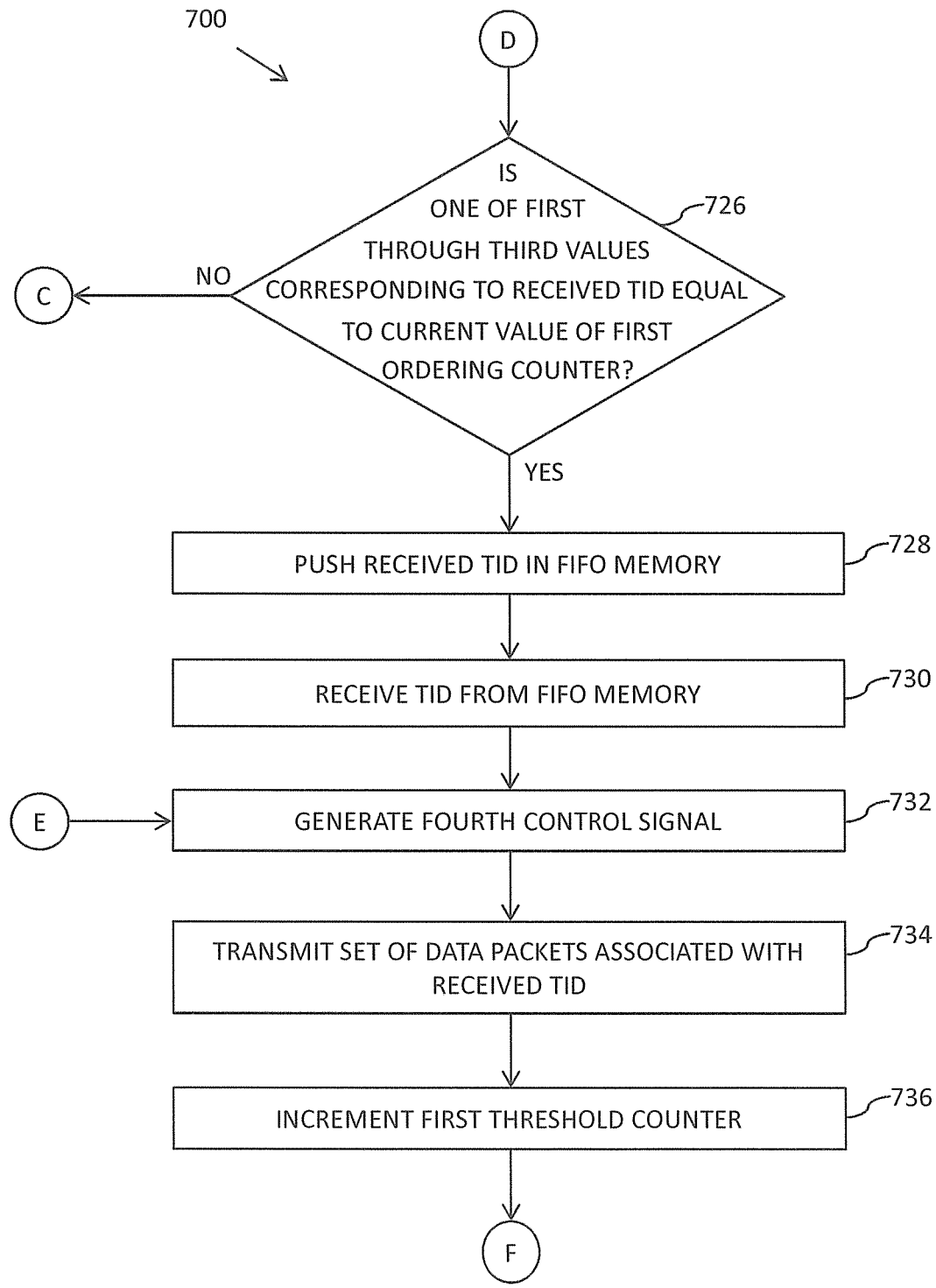
Figure 7D:
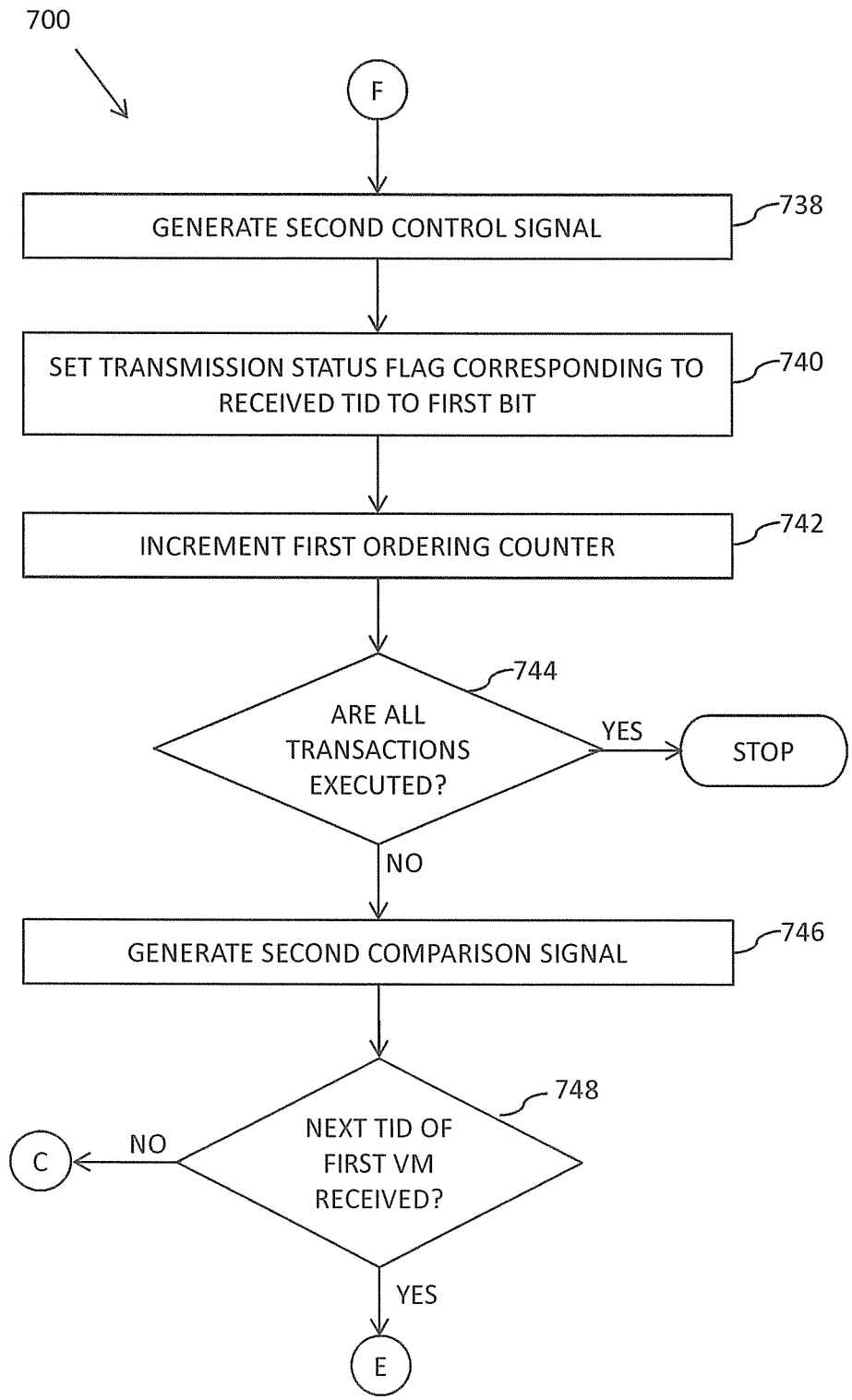

Referring now to FIG. 6G, a block diagram illustrating transmission of the sixth set of data packets D6 by the transaction controller 108 to the master device 102 in accordance with an embodiment of the present invention is shown.

The FIFO pop controller 420 receives the sixth TID T6 and transmits the sixth set of data packets D6 to the master device 102. The transaction table control circuit 114, based on the second control signal CS2, sets the sixth TS flag. The O2 and TH2 counters 206*b* and 412*b* are incremented to values of "3" and "1", respectively, and the TH1 counter 412*a* is reset.

Thus, the transaction controller 108 transmits the first through third and fourth through sixth sets of data packets to the master device 102 in-order.

Referring now to FIGS. 7A-7D, a flow chart 700 illustrating a method for ordering the first through third transactions in accordance with an embodiment of the present invention is shown.

At steps 702, the transaction controller 108 determines accessibility of the transaction table 302 based on the TS flag (FIG. 3B, column 320 of the transaction table 302). That is, the controller 108 checks whether this location in the table 302 is accessible (i.e., occupied) by checking the value of the TS flag. If at step 704, the transaction controller 108 determines that the transaction table 302 is inaccessible, then the transaction controller 108 waits until the transaction table 302 is accessible by continuing to check the TS flag (repeating step 704). If at step 704, the transaction controller 108 determines that the transaction table 302 is accessible, step 706 is executed.

At step 706, the transaction controller 108 generates and provides the status signal SS to the master device 102. At step 708, the transaction controller 108 receives a set of TAs (one of the first through third sets of TAs) when an associated transaction is initiated by the master device 102. At step 710, the received set of TAs and one of the first through third values of the S1 counter 204*a* associated with the received set of TAs are stored in the transaction table 302. At step 712, the S1 counter 204*a* is incremented.

At step 714, the transaction controller 108 determines whether each of the first through third transactions has been initiated by the master device 102 (i.e., whether each of the first through third sets of TAs has been received). If at step 714, the transaction controller 108 determines that each of the first through third transactions has not been initiated, step 702 is executed. If at step 714, the transaction controller 108 determines that each of the first through third transactions has been initiated, step 716 is executed. Initiation of a transaction can be determined using the SEQ_CNT 324 of the transaction table 302.

At step 716, the transaction controller 108 receives a set of data packets (say the second set of data packets) along with a corresponding TID (i.e., the second TID). At step 718, the received set of data packets is stored in the data buffer 404 (i.e., in one of the first through sixth memory blocks 404*a*-404*f*). At step 720, the transaction controller 108 generates the first control signal CS1. At step 722, the transaction controller 108 sets an RS flag corresponding to the received TID (i.e., the second RS flag) based on the first control signal CS1. At step 724, the transaction controller 108 determines whether the received set of data packets has been received out-of-order (i.e., determines whether the second or third set of data packets is received before the first set of data packets, or the third set of data packets was received before the second set of data packets). The determination is based on the first through third values.

At step 726, the transaction controller 108 determines whether one of the first through third values corresponding to the received TID (i.e., the second value corresponding to the second TID) is equal to a current value of the O1 counter 206*a*. If at step 726, the transaction controller 108 determines that one of the first through third values is not equal to the current value of the O1 counter 206*a* (i.e., determines that the second set of data packets was received before the first set of data packets), step 716 is executed. In an example, at step 716, the first set of data packets is received after the reception of the second set of data packets D2, so steps 718-726 are executed.

At step 728, the received TID (i.e., the first TID) is pushed in the FIFO memory 416. At step 730, a TID (i.e., the pushed TID) is read from the FIFO memory 416 by the FIFO pop controller 420. At step 732, the transaction controller 108 generates the fourth control signal CS4 for transmission of a set of data packets associated with the received TID (i.e., the first set of data packets). At step 734, the transaction controller 108 transmits the set of data packets associated with the received TID to the V1M 110*a*. At step 736, the transaction controller 108 increments the TH1 counter 412*a*. At step 738, the transaction controller 108 generates the second control signal CS2. At step 740, the transaction controller 108 sets a TS flag corresponding to the received TID (i.e., the first TS flag). At step 742, the first ordering counter 206*a* is incremented.

At step 744, the transaction controller 108 determines whether all transactions corresponding to the first set of transactions have been executed based on the values of the first through third TS flags. If at step 744, the transaction controller 108 determines that all of the transactions have not been executed, step 746 is executed. At step 746, the transaction controller 108 generates the second comparison signal CO2. At step 748, the transaction controller 108 determines whether the next TID (i.e., the second TID) of the first VM 110*a* has been received, based on the second comparison signal CO2. If at step 748, the transaction controller 108 determines that the next TID has been received, steps 732-742 are executed, and the second set of data packets is transmitted. Further, at step 744, the transaction controller 108 determines whether all of the transactions corresponding to the first set of transactions have been executed. If at step 744, the transaction controller 108 determines that all of the transactions have not been executed (i.e., the third set of data packets is yet to be transmitted), steps 746-748 are executed. If at step 748, the transaction controller 108 determines that the next TID has not been received, steps 716-744 are executed to transmit the third set of data packets.

If at step 726, the transaction controller 108 determines that one of the first through third values is equal to the current value of the O1 counter 206*a* (i.e., the second set of data packets was received in-order), the second TID is pushed in the FIFO memory 416 and steps 730-748 are executed.

It will be apparent to a person skilled in the art that transaction controller 108 performs similar steps with any number of VMs. Thus, the fourth through sixth transactions associated with the second VM 110*b* are ordered by the transaction controller 108 based on the third, fifth, and sixth control signals CS3, CS5, and CS6, as explained above with reference to FIGS. 6A-6G.

The transaction controller 108 orders the first and second sets of transactions using the sets of sequence and ordering counters 204 and 206. Thus, the SoC 100 requires less area and consumes less power than conventional SoCs (which include multiple data buffers for queuing sets of data packets that are received out-of-order). Further, the transaction controller 108 prevents latency in the transmission of the fourth through sixth sets of data packets due to the first through third sets of data packets, as the transmission of the fourth through sixth sets of data packets is independent of the first through third sets of data packets.

It will be understood by those of skill in the art that the same logical function may be performed by different arrangements and configurations of components using either positive or negative signals. Therefore, variations in the arrangement and configurations of some of the components described above should not be considered to depart from the scope of the present invention. It also will be understood by those of skill in the art that logic circuits may be designed using either positive or negative logic, so when a term such as "set" is used, for positive logic that means setting a bit to a logic 1 and for negative logic it means setting a bit to a logic 0.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A transaction controller for ordering a plurality of transactions between a master device and a slave device, wherein the transaction controller comprises:
    a transaction table, a first sequence counter, and a first ordering counter, wherein when first and second transactions of the plurality of transactions are initiated by the master device, the first sequence counter has first and second values, respectively, wherein the first ordering counter is incremented with each transmission of first and second sets of data packets that are associated with the first and second transactions, respectively, from the transaction controller to the master device, and wherein the transaction controller is configured to:
    record in the transaction table, the first and second values with first and second transaction identifiers (TIDs) associated with the first and second transactions, respectively, wherein the first transaction is initiated before the second transaction;
    determine, based on the second value, the second TID, and a current value of the first ordering counter, whether the transaction controller has received from the slave device, the second set of data packets after the first set of data packets; and
    transmit to the master device, based on the determination, the first and second sets of data packets, wherein the second set of data packets is transmitted after the transmission of the first set of data packets, thereby ordering the first and second transactions,
    wherein the transaction table further stores first and second sets of transaction attributes that are associated with the first and second transactions, respectively, and the first and second sets of transaction attributes are associated with the first and second TIDs, the first and second values, and first and second virtual master identifiers (VMIDs), respectively, and wherein the first and second VMIDs indicate association of the first and second TIDs with first and second VMs of the master device, respectively.

2. The transaction controller of claim 1, wherein the master device, the transaction controller, and the slave device operate according to an advanced extensible interface (AXI) protocol, and wherein the first and second sets of transaction attributes are based on the AXI protocol.

3. The transaction controller of claim 1, wherein the first and second sets of transaction attributes are further associated with first and second burst lengths, first and second burst sizes, first and second transmission status flags, and first and second reception status flags, respectively, and wherein:
    the first and second burst lengths indicate a number of data packets in the first and second sets of data packets, respectively,
    the first and second burst sizes indicate a number of data bytes in each data packet of the first and second sets of data packets, respectively,
    the first and second transmission status flags indicate whether the first and second sets of data packets have been transmitted to the master device, respectively, and
    the first and second reception status flags indicate whether the first and second sets of data packets have been received by the transaction controller, respectively.

4. The transaction controller of claim 3, wherein the first and second TIDs, the first and second burst lengths, and the first and second burst sizes are transmitted by the master device to the slave device, and wherein the first and second TIDs, the first and second VMIDs, the first and second burst lengths, and the first and second burst sizes are transmitted by the master device to the transaction controller.

5. The transaction controller of claim 3, wherein the transaction controller comprises:
    a counter control circuit that receives the first and second sets of data packets, first and second transmission status flags, and the first and second TIDs, and generates a first control signal indicating the reception of each of the first and second sets of data packets by the counter control circuit, wherein the counter control circuit increments the first sequence counter with each reception of the first and second TIDs, and wherein the first and second transmission status flags indicate transmission of the first and second sets of data packets to the master device, respectively;
    a transaction table control circuit that (i) receives a second control signal indicating the transmission of each of the first and second sets of data packets to the master device, (ii) is connected to the counter control circuit for receiving the first and second TIDs, the first and second values, and the first control signal, (iii) saves the first and second values with the first and second TIDs in the transaction table, (iv) sets the first and second transmission status flags when the first and second sets of data packets are transmitted to the master device, and (v) sets first and second reception status flags when the first and second sets of data packets have been received by the transaction controller, respectively; and
    a transaction execution circuit that (i) is connected to the transaction table control circuit for receiving the saved first and second values and the first and second TIDs, (ii) is connected to the counter control circuit for receiving the current value and the first and second sets of data packets, respectively, (iii) compares the second value with the current value to determine whether the second set of data packets was received after the first set of data packets, and (iv) generates the second control signal.

6. The transaction controller of claim 5, wherein the counter control circuit includes:
   a set of sequence counters associated with a set of virtual masters (VMs) of the master device, respectively, wherein the set of sequence counters includes a first sequence counter that is associated with a first VM of the set of VMs, and wherein the first and second sets of data packets are associated with the first VM;
   a set of ordering counters associated with the set of VMs, respectively, wherein the set of ordering counters includes a first ordering counter that is associated with the first VM; and
   a counter controller that (i) is connected to the sets of sequence and ordering counters, (ii) is connected to the transaction table control circuit for receiving the first and second transmission status flags, (iii) receives the first and second sets of data packets, (iv) generates the first control signal, and (v) increments the first ordering counter based on the first and second transmission status flags, wherein the counter controller increments the first sequence counter with each reception of the first and second sets of data packets.

7. The transaction controller of claim 5, wherein the transaction table control circuit includes the transaction table and a transaction table controller that (i) is connected to the transaction execution circuit for receiving the second control signal, (ii) is connected to the counter control circuit for receiving the first and second values, the first and second TIDs, and the first control signal, (iii) is connected to the transaction table for storing the first and second values with the first and second TIDs in the transaction table, (iv) provides the first and second transmission status flags to the counter control circuit, (v) generates a status signal indicating an accessibility of the transaction table by the master device, and (vi) provides the status signal to the master device, and the first and second values to the transaction execution circuit.

8. The transaction controller of claim 5, wherein the transaction execution circuit includes:
   a first comparison circuit that (i) is connected to the counter control circuit for receiving the current value and the first and second TIDs, and the transaction table control circuit for receiving the first and second values, the first and second reception status flags, and first and second virtual master (VM) IDs of first and second VMs of the master device, (ii) receives a third control signal that is indicative of one of the first and second VMs, and (iii) generates a first comparison signal based on a comparison of the second value and the current value;
   a data buffer that receives a fourth control signal, and is connected to the counter control circuit for receiving the first and second sets of data packets and the first and second TIDs, wherein the first set of data packets is transmitted to the master device based on the fourth control signal;
   a first-in-first-out (FIFO) control circuit that receives a fifth control signal that indicates whether a final value of a first threshold counter associated with the first VM has exceeded a predetermined threshold count, and a second comparison signal that is indicative of a presence of a third TID associated with the first VM and a third set of data packets in the transaction table, and is connected to the counter control circuit and the first comparison circuit for receiving the first TID and the first comparison signal, respectively, and generates the second through fourth control signals;
   a second comparison circuit connected to the transaction table control circuit for receiving first and second sets of transaction attributes associated with the first and second transactions, respectively, and generating the second comparison signal, wherein the first and second sets of transaction attributes are associated with at least the first and second transmission status flags and the first and second VMIDs, respectively; and
   a threshold control circuit connected to the FIFO control circuit for receiving the second control signal and generating the fifth control signal.

9. The transaction controller of claim 8, wherein the FIFO control circuit comprises:
   a FIFO memory that stores at least the first TID, wherein the first TID is pushed in the FIFO memory based on the first comparison signal, and wherein the third TID is pushed in the FIFO memory based on a sixth control signal;
   a FIFO push controller connected to the counter control circuit and the first comparison circuit for receiving the first TID and the first comparison signal, respectively, wherein the FIFO push controller receives the sixth control signal; and
   a FIFO pop controller connected to the second comparison circuit, the threshold control circuit, and the FIFO memory for receiving the second comparison signal, the fifth control signal, and the first TID, respectively, wherein the FIFO pop controller generates the second through fourth and sixth control signals.

10. The transaction controller of claim 8, wherein the threshold control circuitry comprises:
    a set of threshold counters that includes the first threshold counter; and
    a threshold counter controller connected to the set of threshold counters, wherein the threshold counter controller increments the first threshold counter with each transmission of a set of data packets associated with the first VM to the master device, generates the fifth control signal when the first threshold counter exceeds the threshold count, and resets the first threshold counter when the fifth control signal is generated.

11. The transaction controller of claim 8, wherein the first comparison circuit includes:
    a first multiplexer (MUX) connected to the transaction table control circuit for receiving the first and second VM IDs, and the first TID as a select signal, and outputs a first intermediate signal;
    a second MUX connected to the first MUX for receiving the first intermediate signal and to the counter control circuit for receiving the current value and a third value of a second ordering counter associated with the second VM, wherein the second MUX outputs a second intermediate signal;
    a third MUX connected to the transaction table control circuit for receiving the first and second reception status flags and the first TID as a select signal, and outputs a third intermediate signal;
    a third comparator connected to the first MUX and the FIFO control circuit for receiving the first intermediate signal and the third control signal, respectively, and outputting a third comparison signal;
    a fourth comparator connected to the second MUX and the transaction table control circuit for receiving the second intermediate signal and the second value, respectively, and outputting a fourth comparison signal; and a logic gate connected to the third MUX and the third and fourth comparators for receiving the third intermediate signal and the third and fourth comparison signals, respectively, and outputting the first comparison signal.

12. A method for ordering a plurality of transactions between a master device and a slave device, the method comprising:

incrementing a first sequence counter associated with the master device when a transaction of a plurality of transactions is initiated by the master device, wherein the first sequence counter has a first value when a first transaction of the plurality of transactions is initiated and a second value when a second transaction of the plurality of transactions is initiated;

incrementing a first ordering counter associated with the master device when each of first and second sets of data packets stored in the slave device and associated with the first and second transactions, respectively, is transmitted to the master device;

storing the first and second values of the first sequence counter, by a transaction controller, in a transaction table, based on first and second transaction identifiers (TIDs) that are associated with the first and second transactions of the plurality of transactions, respectively, wherein the first transaction is initiated before the second transaction;

determining, by the transaction controller, based on the second value of the first sequence counter, the second TID, and a current value of the first ordering counter, whether the transaction controller has received from the slave device, the second set of data packets after the first set of data packets; and transmitting to the master device by the transaction controller, the first and second sets of data packets based on the determination, wherein the second set of data packets is transmitted after the first set of data packets, thereby ordering the first and second transactions.

13. The method of claim 12, wherein the determining step further comprises:

comparing, by the transaction controller, the second value with the current value, wherein an equality of the second value and the current value indicates reception of the first set of data packets before the second set of data packets.

14. The method of claim 12, further comprising:
incrementing the first value of the first sequence counter, by the transaction controller, to the second value.

15. The method of claim 12, further comprising:
determining, by the transaction controller, an accessibility of the transaction table for recording the first and second values with the first and second TIDs based on a status signal associated with the transaction table, wherein the status signal indicates whether the transaction table is accessible.

16. The method of claim 12, further comprising:
setting, by the transaction controller, when the first and second sets of data packets are transmitted to the master device, first and second transmission status flags in the transaction table, respectively, wherein the first and second transmission status flags are associated with the first and second sets of data packets, respectively.

17. The method of claim 12, further comprising:
incrementing, by the transaction controller, the first ordering counter when the first set of data packets was transmitted before the second set of data packets.

18. The method of claim 12, further comprising:
setting, by the transaction controller, when the first and second sets of data packets are received by the transaction controller, first and second reception status flags in the transaction table, respectively, which are associated with the first and second sets of data packets, respectively.

19. In a System on a Chip, a transaction controller for ordering a plurality of transactions between a master device and a slave device, the transaction controller comprising:

a counter control circuit including a first sequence counter and a first ordering counter, wherein the counter control circuit receives first and second transaction identifiers (TIDs) that are associated with respective first and second transactions of the plurality of transactions, and also receives from the slave device, first and second sets of data packets that are associated with the first and second transactions, respectively, wherein the first transaction is initiated before the second transaction and first and second values of the first sequence counter are associated with the first and second TIDs when the first and second transactions are initiated, respectively, and wherein the first ordering counter is incremented with each transmission of the first and second sets of data packets from the transaction controller to the master device;

a transaction table control circuit including a transaction table, wherein the transaction table control circuit is connected to the counter control circuit for receiving the first and second TIDs and the first and second values, and recording the first and second values with the first and second TIDs in the transaction table, respectively; and a transaction execution circuit that (i) is connected to the transaction table control circuit for receiving the recorded first and second values and the first and second TIDs, (ii) is connected to the counter control circuit for receiving a current value of the first ordering counter and the first and second sets of data packets (iii) determines based on the second value, the second TID, and the current value, whether the counter control circuitry has received from the slave device, the second set of data packets after the first set of data packets, and (iv) transmits to the master device, based on the determination, the first set of data packets and then the second set of data packets after the transmission of the first set of data packets, thereby ordering the first and second transactions, wherein the counter control circuit further includes:
a set of sequence counters associated with a set of virtual masters (VMs) of the master device, respectively, wherein the set of sequence counters includes the first sequence counter that is associated with a first VM of the set of VMs, and wherein the first and second sets of data packets are associated with the first VM;

a set of ordering counters associated with the set of VMs, respectively, wherein the set of ordering counters includes the first ordering counter that is associated with the first VM.

20. The transaction controller of claim 19, wherein the counter control circuit includes:
a counter controller that (i) receives the first and second sets of data packets, (ii) is connected to the sets of sequence and ordering counters, (iii) is connected to the transaction table control circuit for receiving first and second transmission status flags that are indicative of transmission of the first and second sets of data packets to the master device, respectively, and (iv) increments the first ordering counter based on the first and second transmission status flags, wherein the counter controller increments the first sequence counter with each reception of the first and second sets of data packets, and wherein the counter controller provides the first and second TIDs and the first and second values to the transaction table control circuit, and the current value of the first ordering counter and the first and second sets of data packets to the transaction execution circuit.

* * * * *